United States Patent [19]
Flototto et al.

[11] Patent Number: 5,974,985
[45] Date of Patent: Nov. 2, 1999

[54] TABLE

[75] Inventors: Reinhard-Heinrich Flototto, Gutersloh; Martin Stosch, Detmold; Bernd Diekmann, Halle, all of Germany

[73] Assignee: Flötotto Einrichtungssysteme GmbH & Co. KG, Gütersloh, Germany

[21] Appl. No.: 08/817,785
[22] PCT Filed: Oct. 19, 1995
[86] PCT No.: PCT/EP95/04101
§ 371 Date: Jul. 15, 1997
§ 102(e) Date: Jul. 15, 1997
[87] PCT Pub. No.: WO96/12423
PCT Pub. Date: May 2, 1996

[30] Foreign Application Priority Data

Oct. 20, 1994 [DE] Germany .............................. 44 37 553

[51] Int. Cl.[6] .................................................. A47B 3/06
[52] U.S. Cl. .................................. 108/157.18; 108/50.01
[58] Field of Search ................................ 108/64, 50.11, 108/50.01, 50.02, 157.18, 157.1, 157.15; 312/223.3, 195

[56] References Cited

U.S. PATENT DOCUMENTS

| | | |
|---|---|---|
| 2,628,141 | 2/1953 | Scheuer ........................ 108/157.18 X |
| 3,241,885 | 3/1966 | Deaton ................... 108/64 X |
| 4,163,592 | 8/1979 | Nelson ................... 108/64 X |
| 4,852,500 | 8/1989 | Ryburg et al. ................... 108/50.01 X |
| 4,986,194 | 1/1991 | Bollman ................... 108/64 X |
| 5,078,055 | 1/1992 | Bellini et al. ................... 108/64 |
| 5,144,888 | 9/1992 | Heine et al. ................... 108/64 |
| 5,522,324 | 6/1996 | Van Gelder et al. ................... 108/64 X |
| 5,755,164 | 5/1998 | Korte et al. ................... 108/157.18 |

FOREIGN PATENT DOCUMENTS 268802 6/1988 European Pat. Off. ........... 312/223.3

*Primary Examiner*—José V. Chen
*Attorney, Agent, or Firm*—Snell & Wilmer LLP

[57] ABSTRACT

A table with a frame, a table plate and at least three table legs, whose table legs as well as optional desk accessories such as a telephone holder or a working lamp may be fastened onto the frame in a slot. The table legs or desk accessories are preferably inserted into the slot through an adapter. The table frame may be formed from frame sections connected to each other by means of corner connectors. Onto the frame a slidable and tiltable carrier for a computer monitor can be mounted. Individual tables can be connected to each other by connectors.

17 Claims, 16 Drawing Sheets

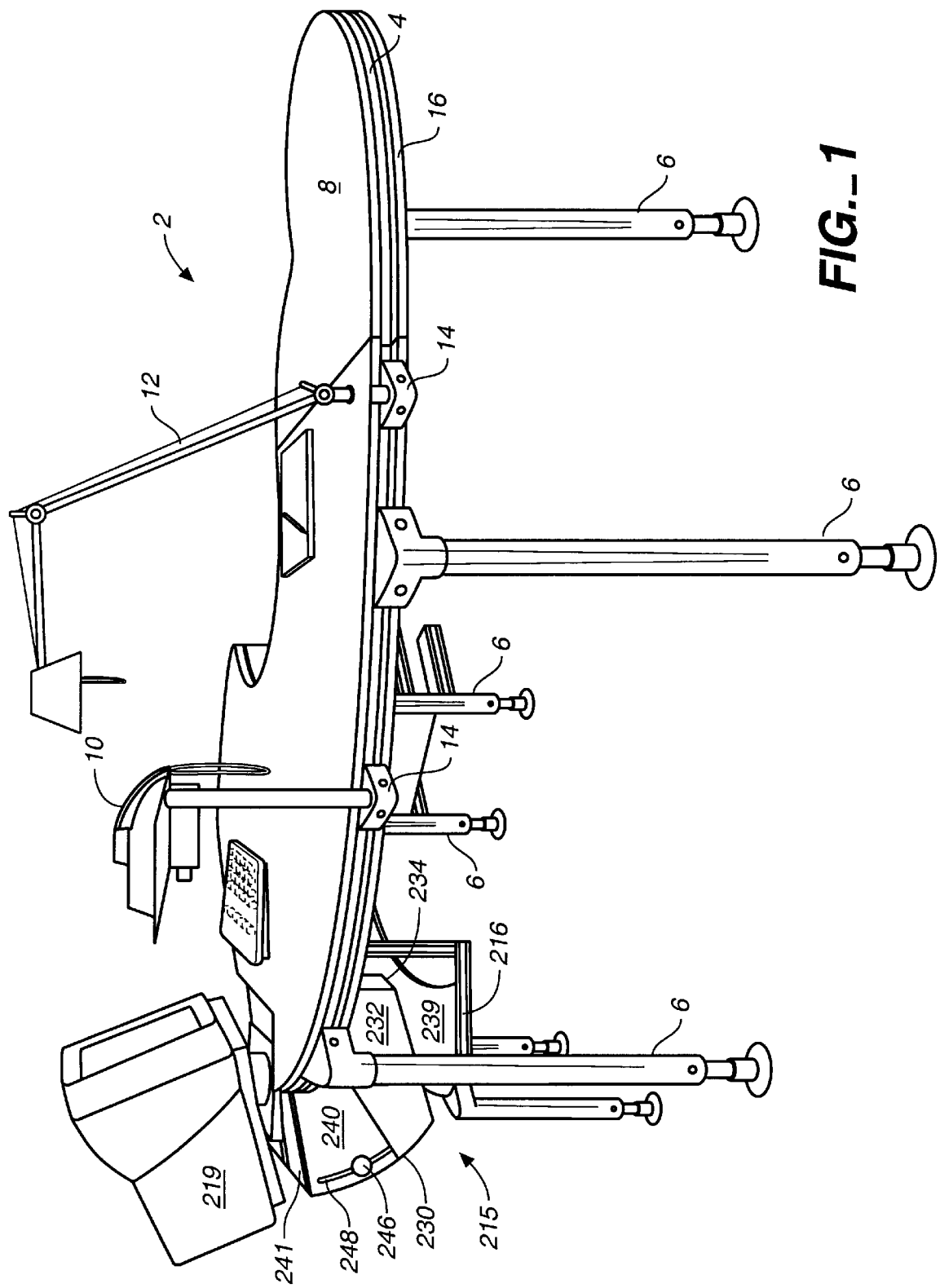
FIG._1

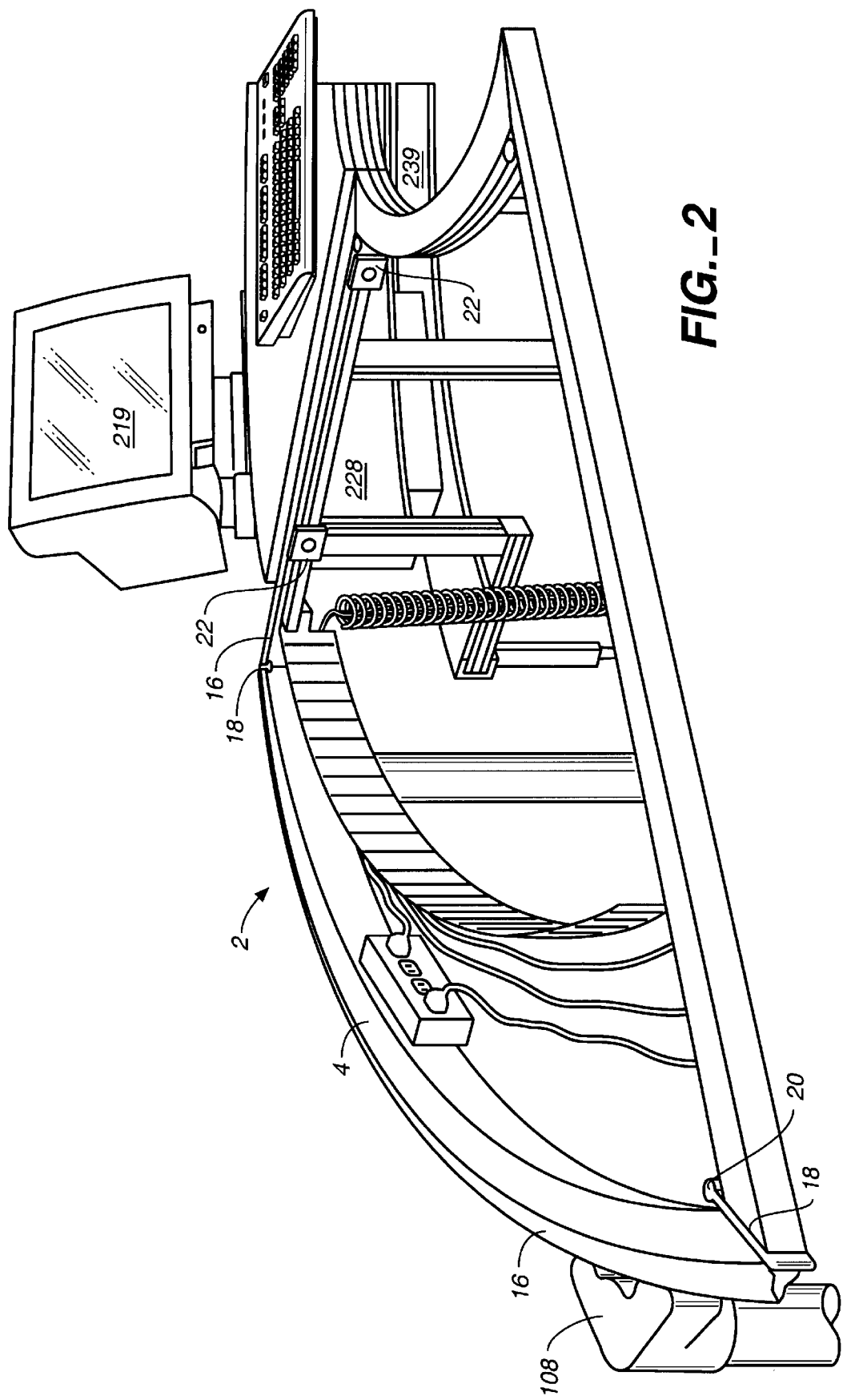
FIG._2

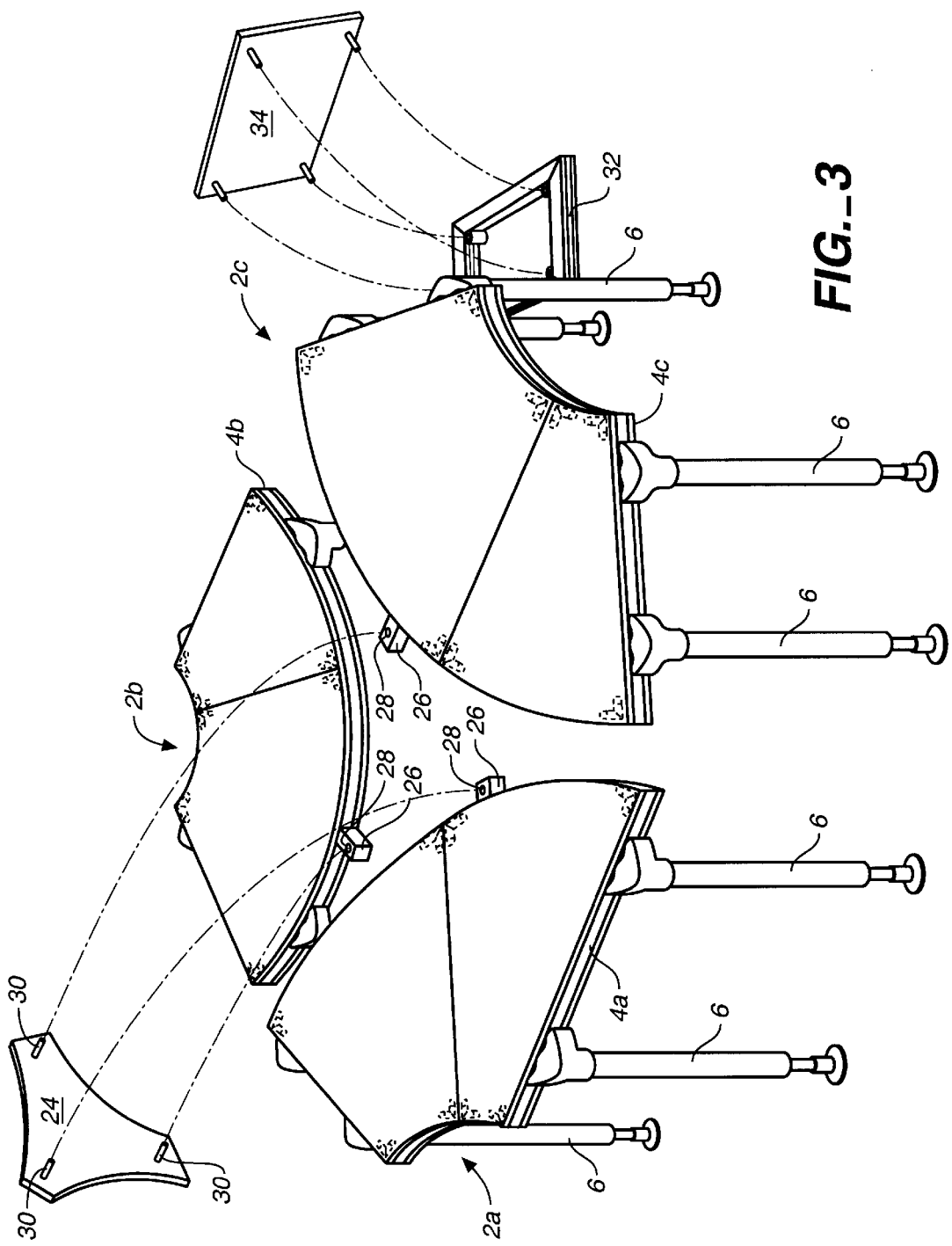
FIG._3

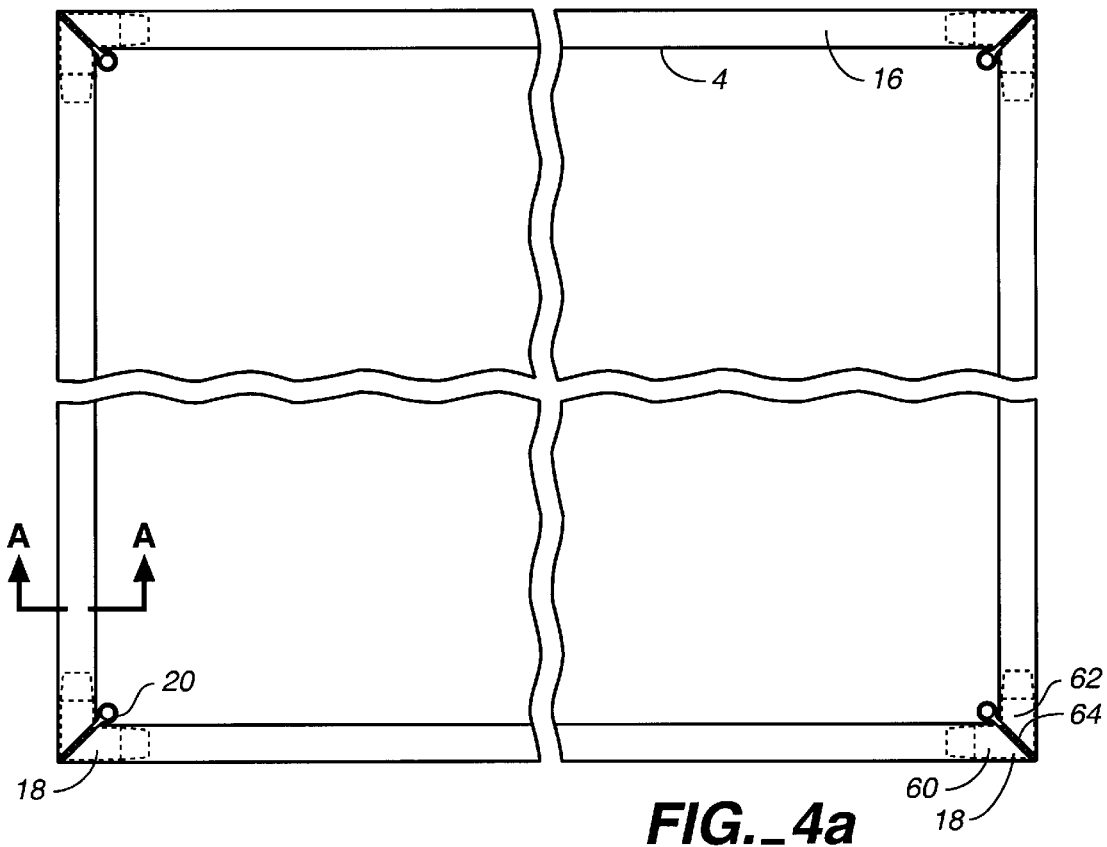
*FIG._4a*
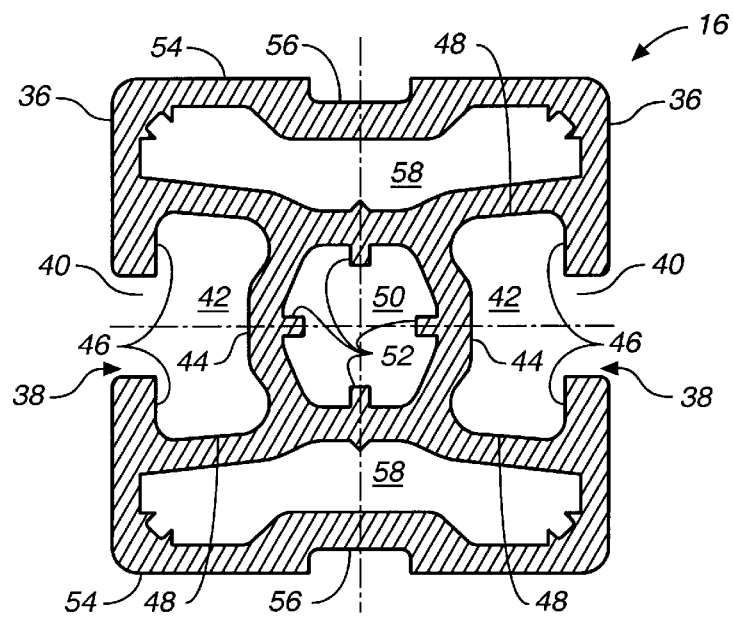
*FIG._4b*

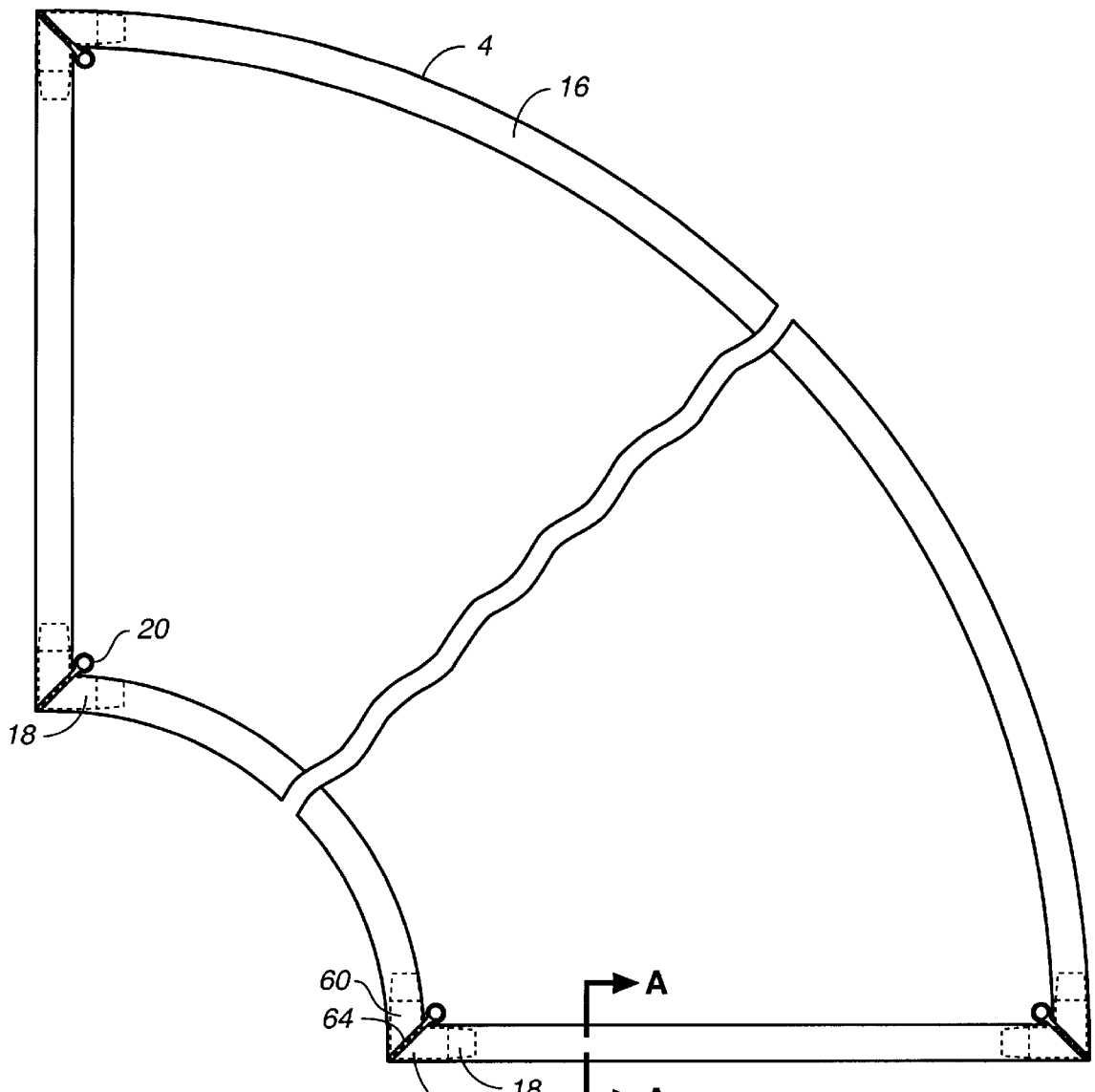
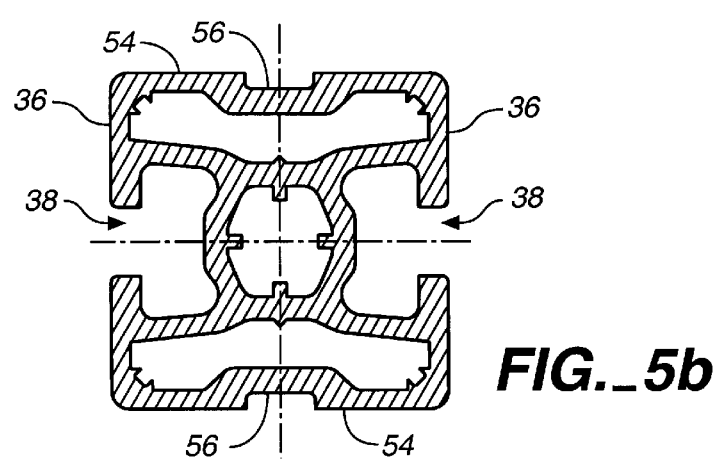
FIG._5a
FIG._5b

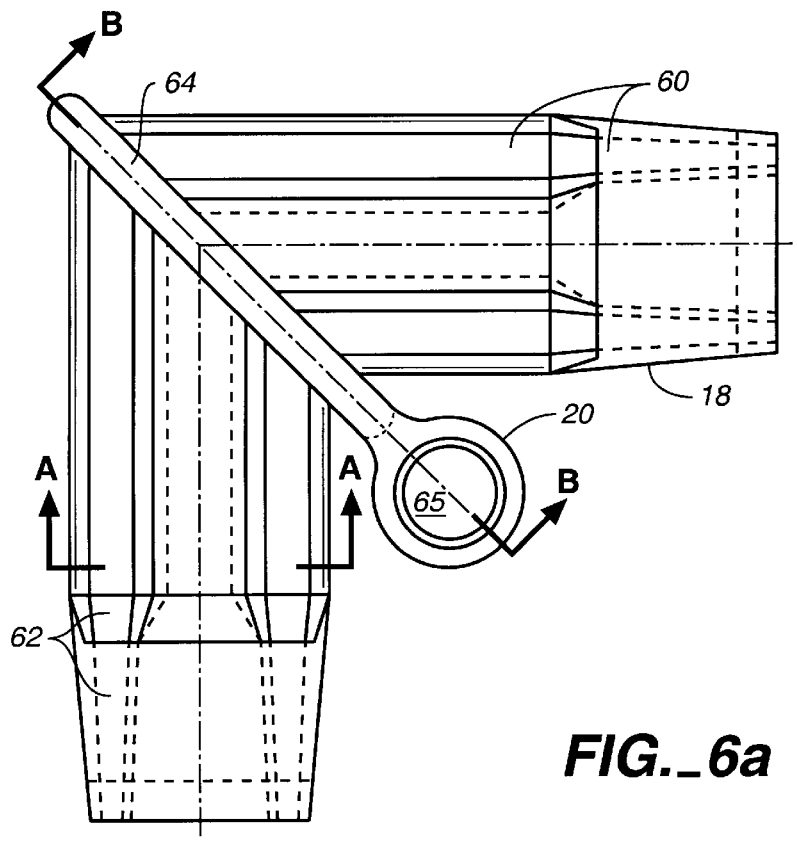
FIG._6a
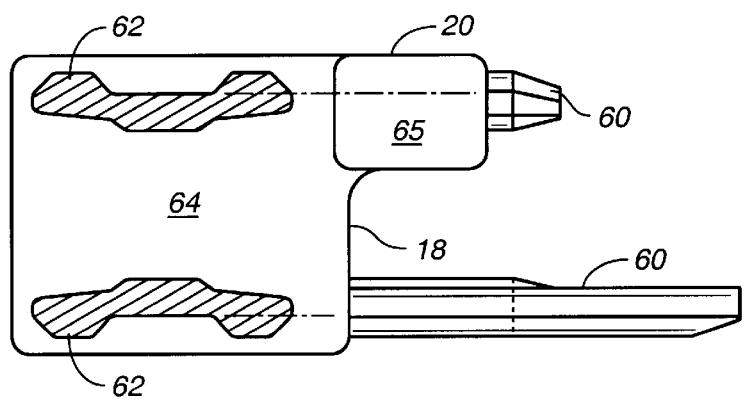
FIG._6b
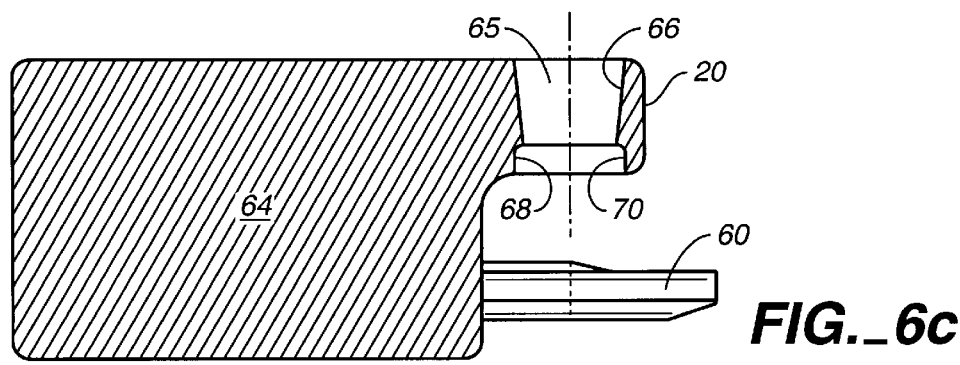
FIG._6c

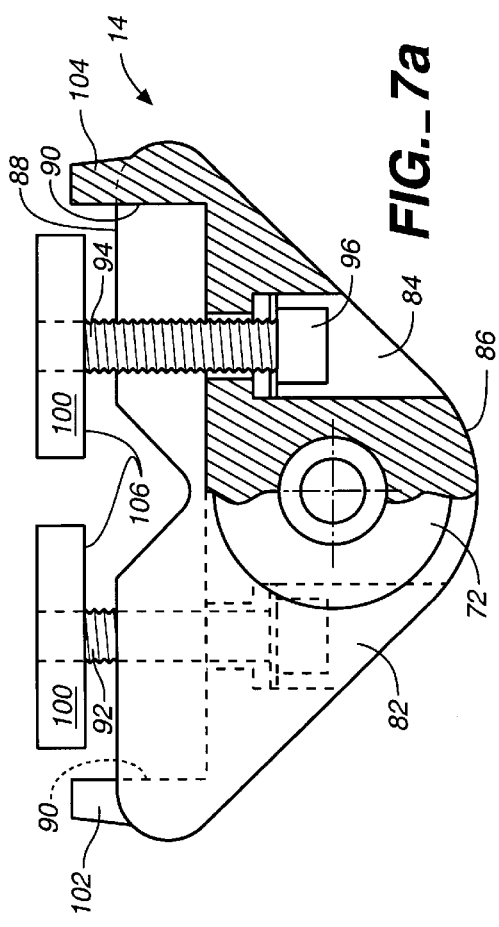
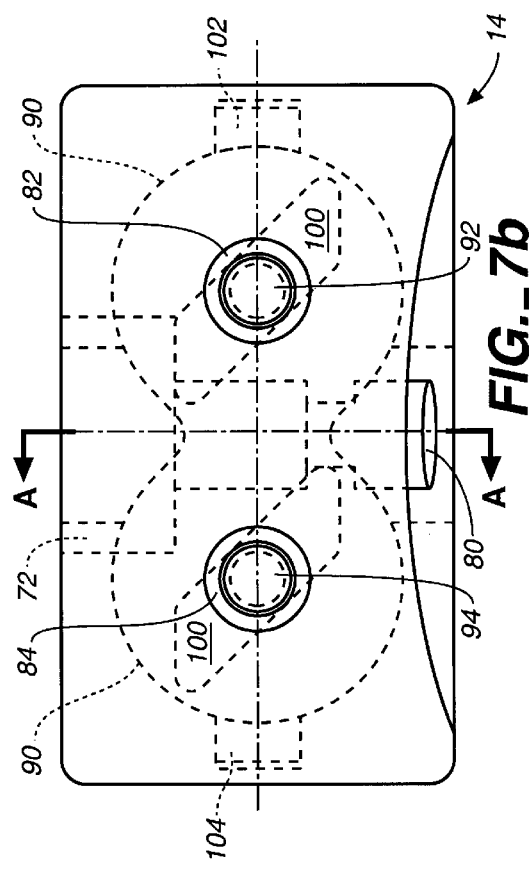
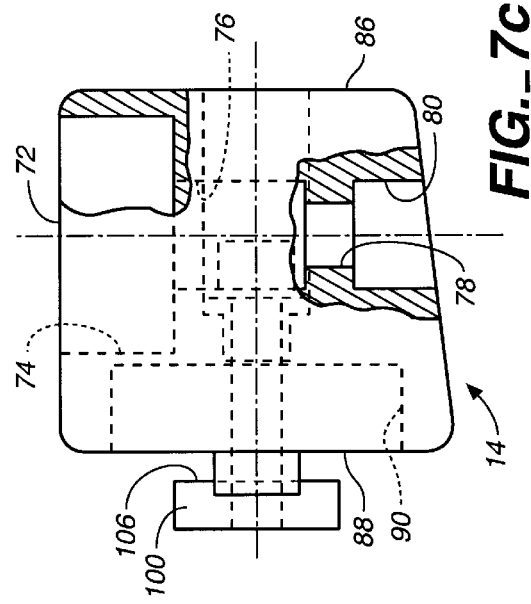

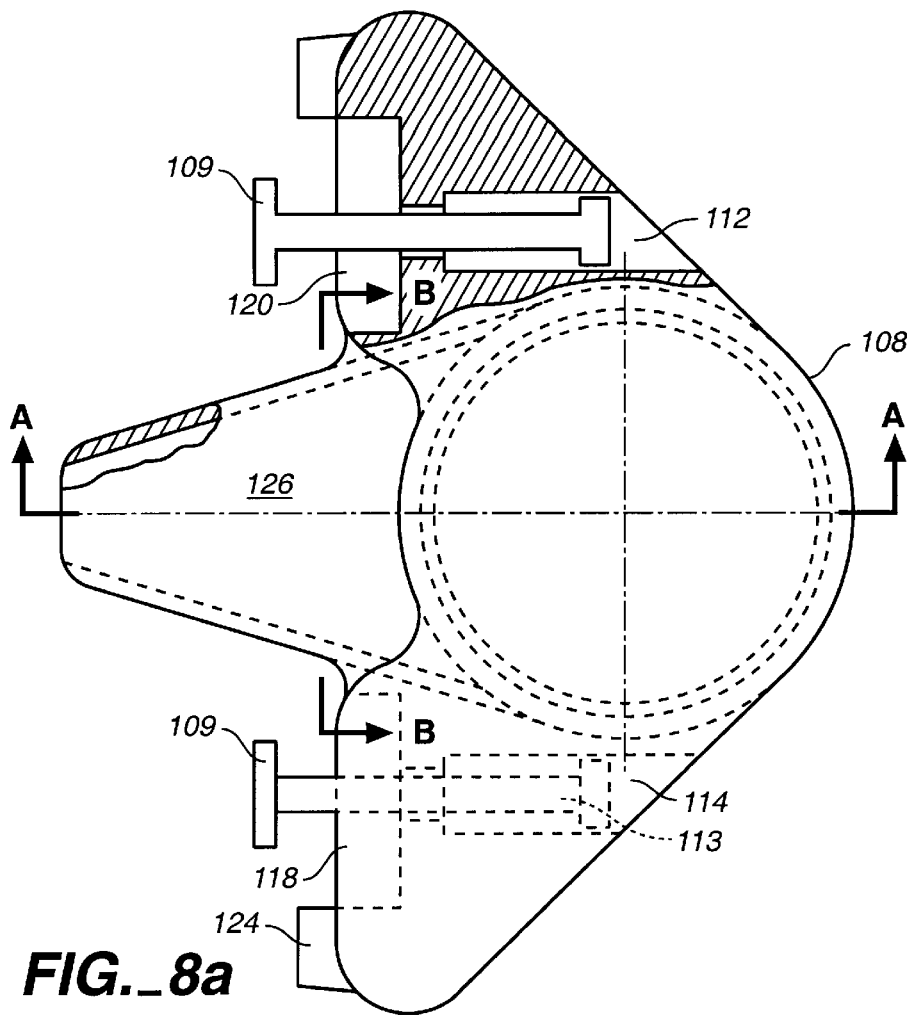
FIG._8a
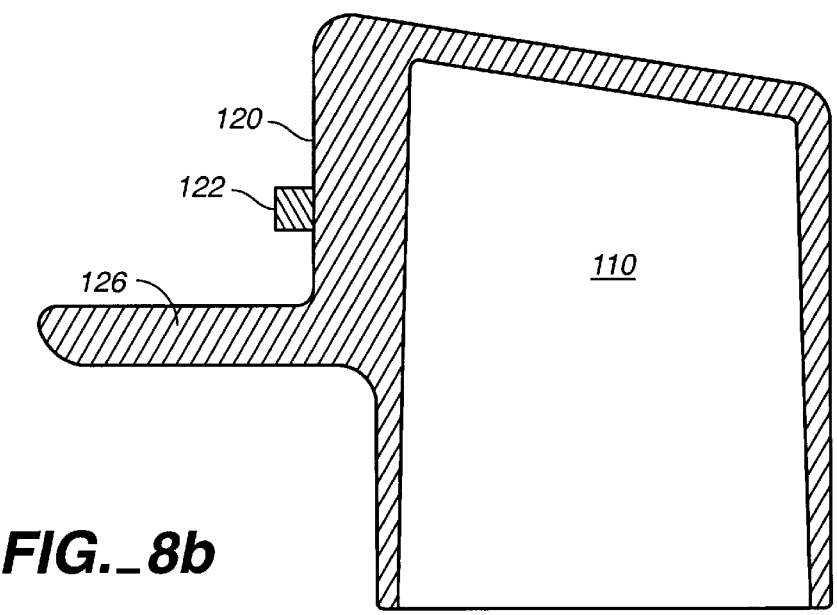
FIG._8b

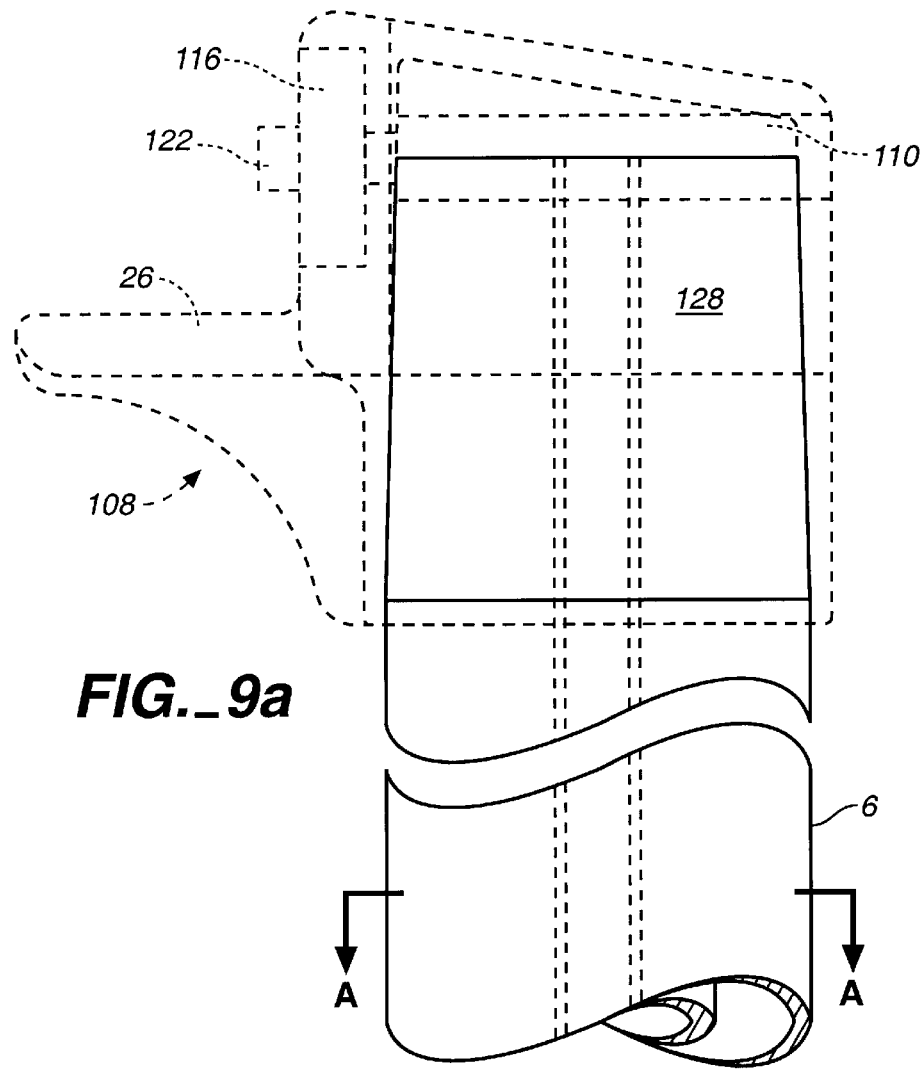
FIG._9a
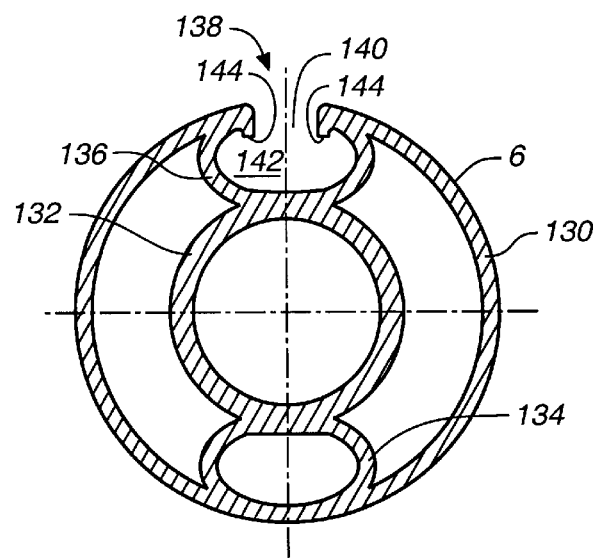
FIG. 9b

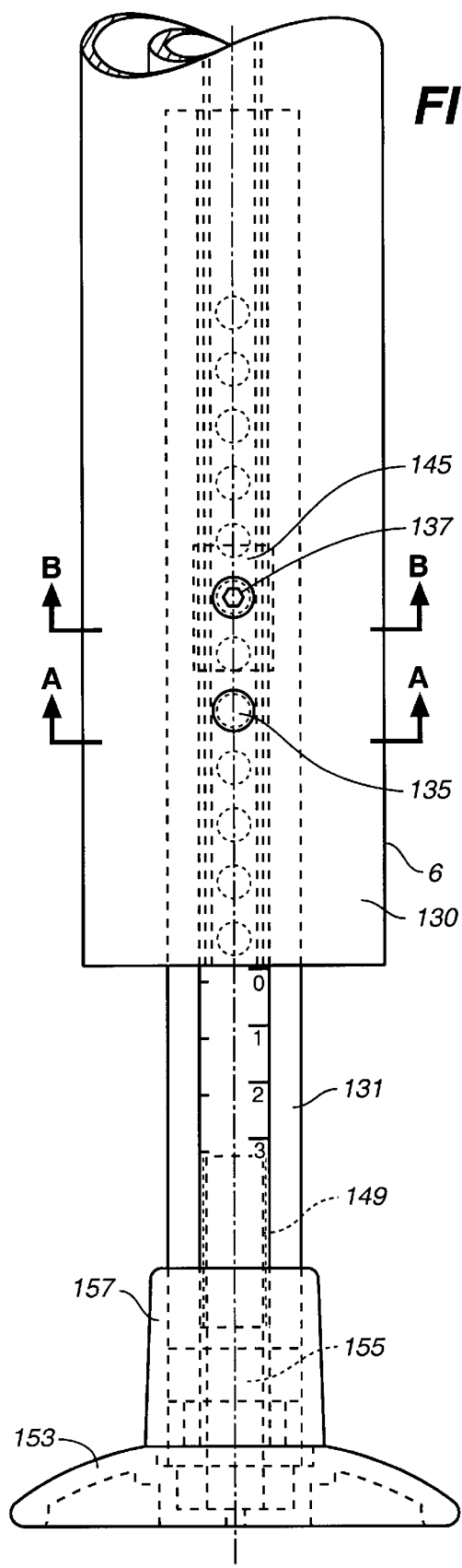
FIG._10a
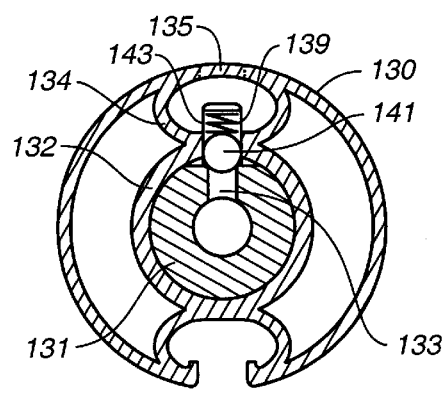
FIG._10b
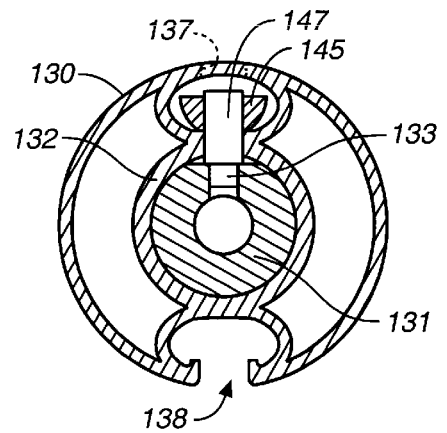
FIG._10c

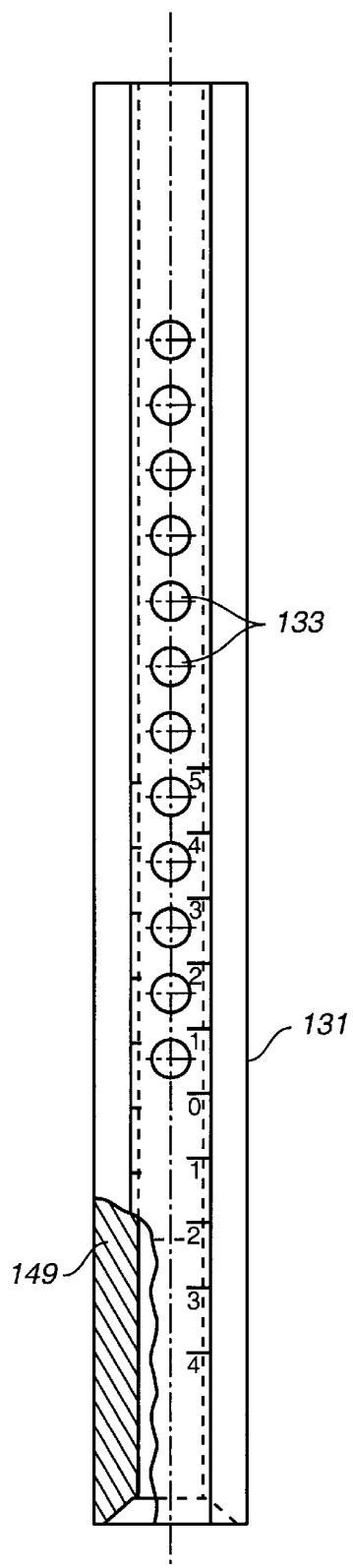
FIG._10d
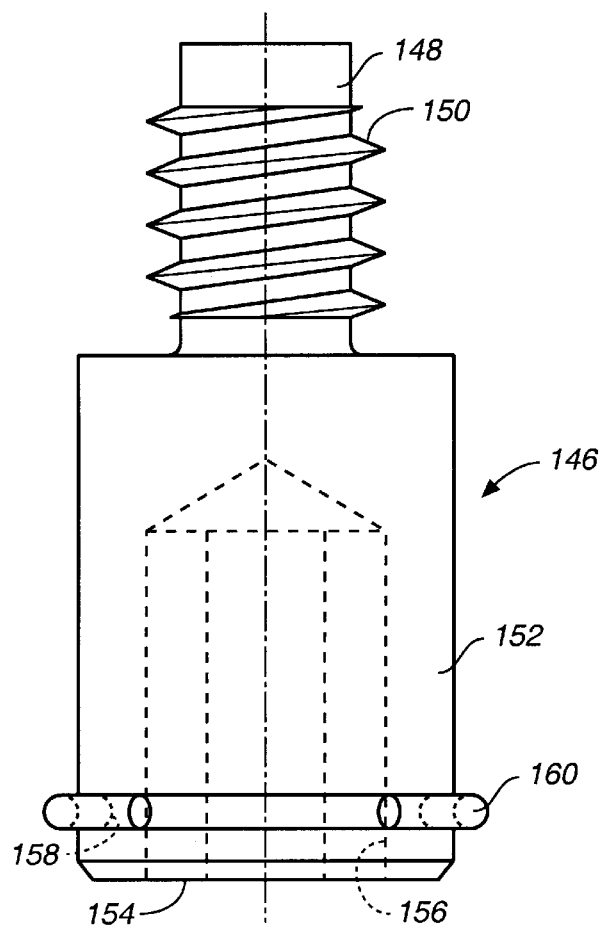
FIG._11

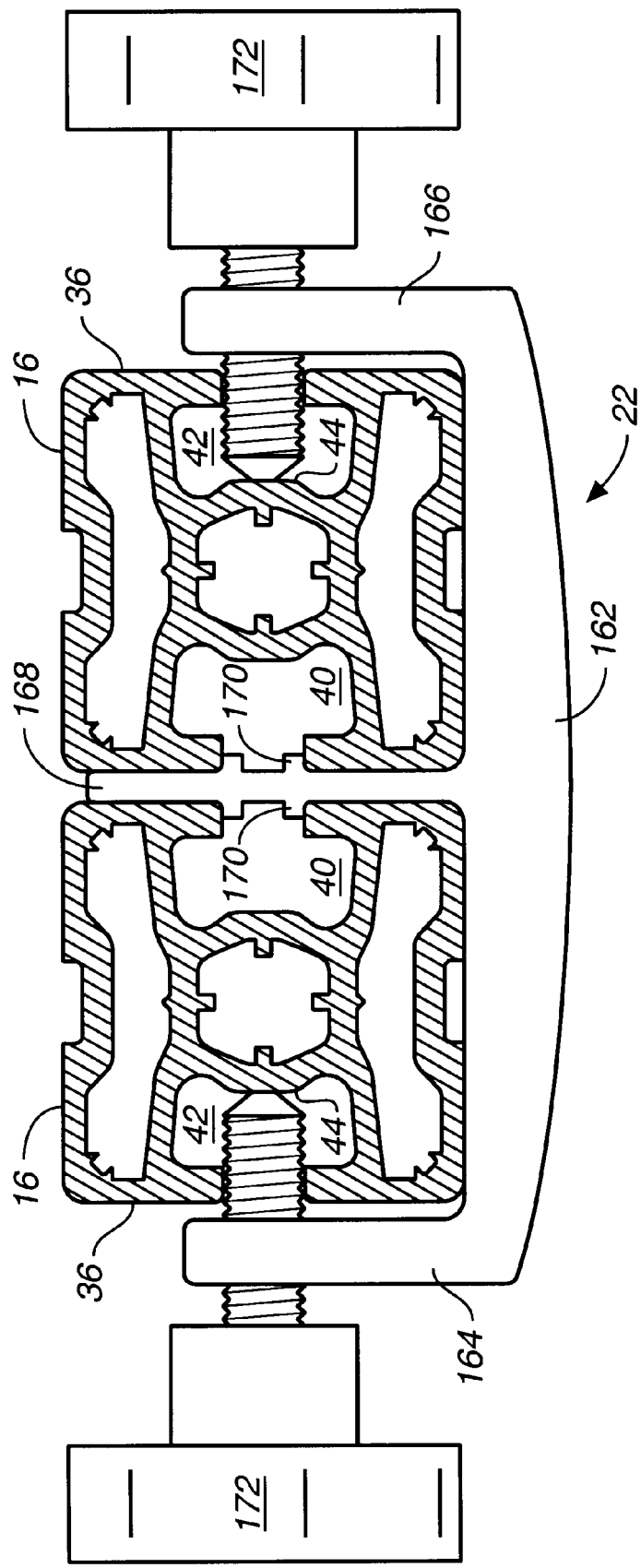
FIG._12

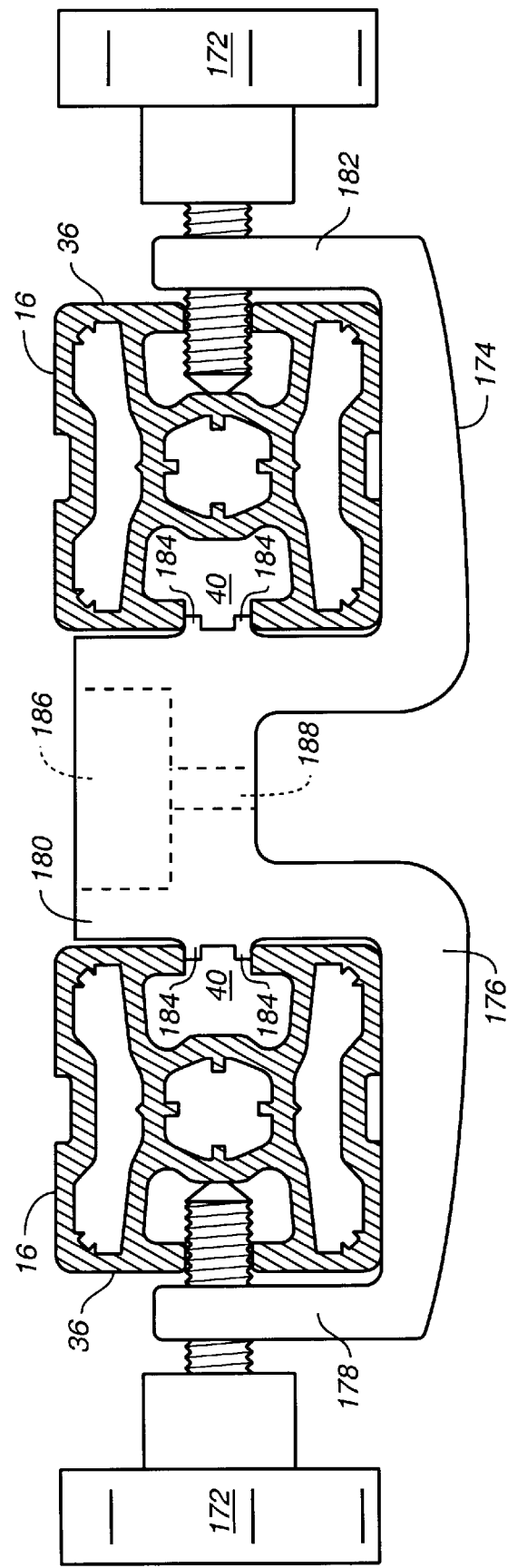
FIG._13

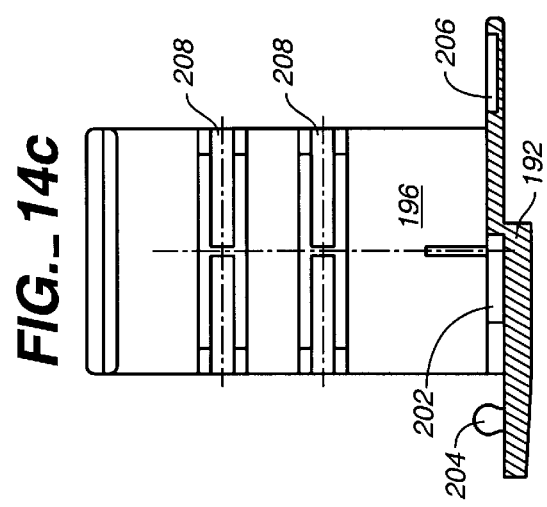
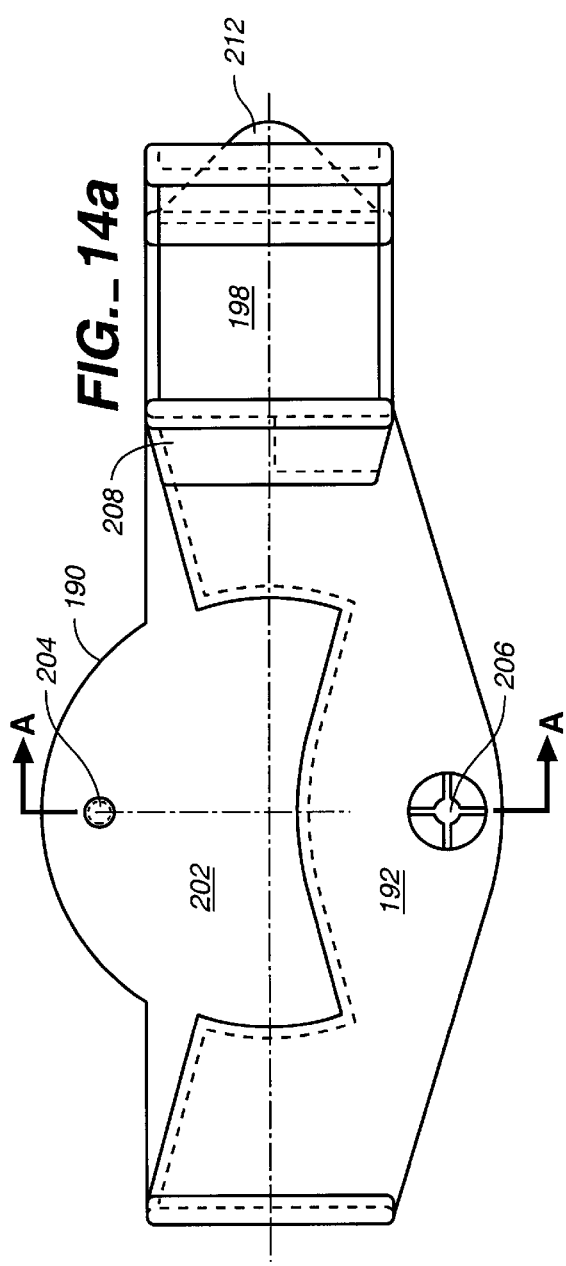
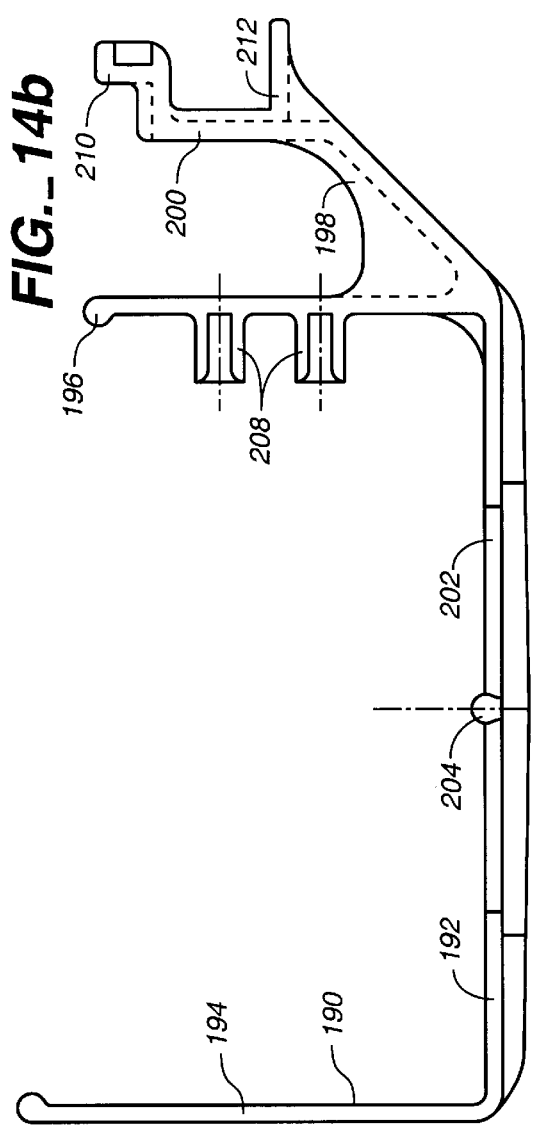

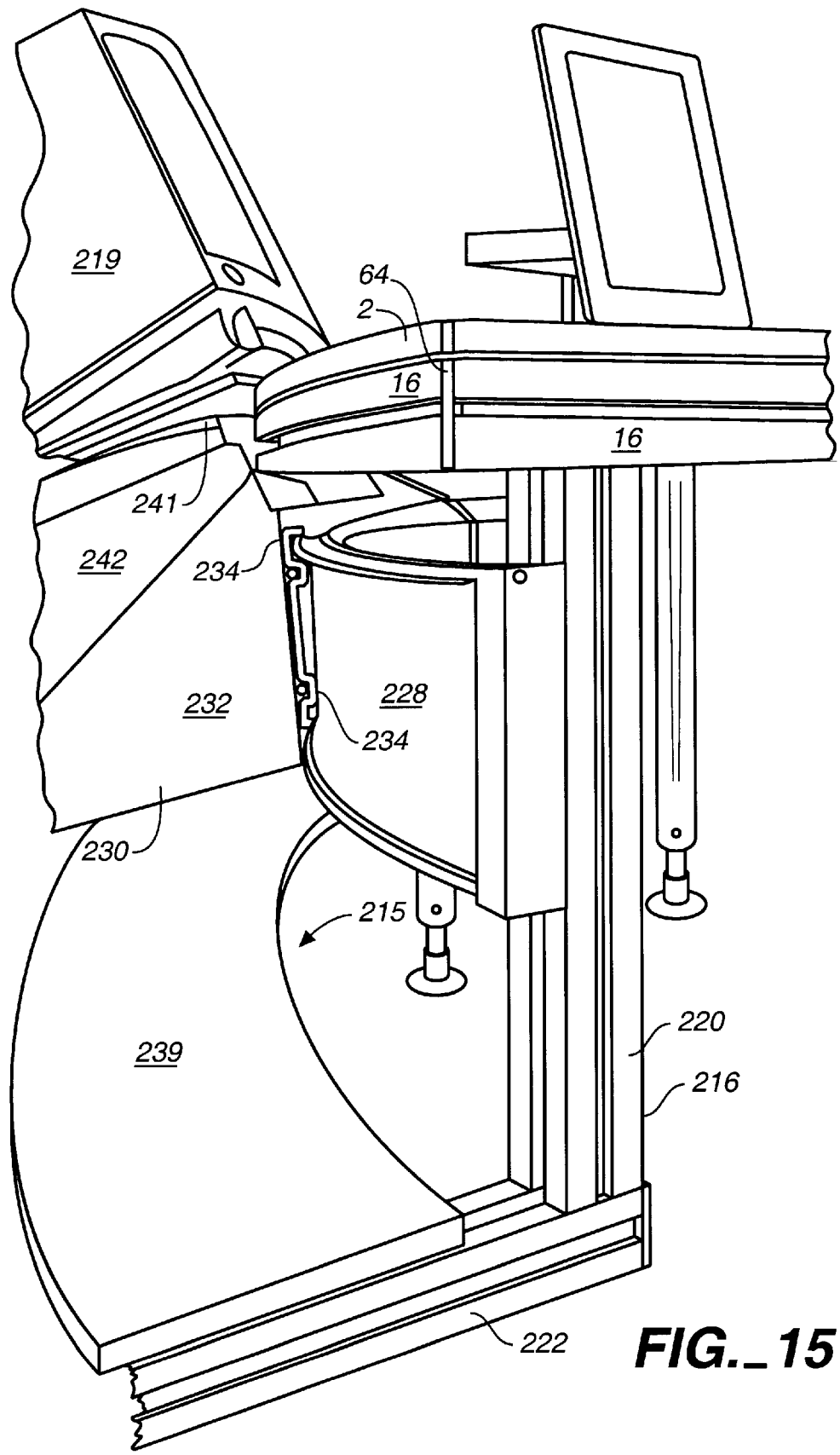
FIG._15

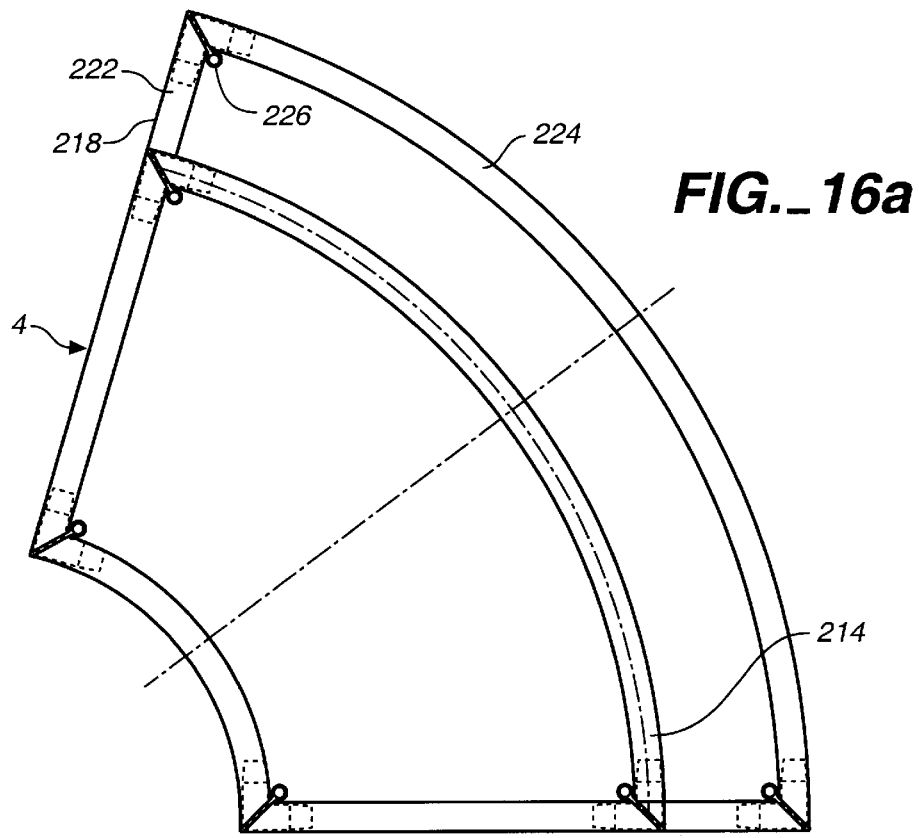
FIG._16a
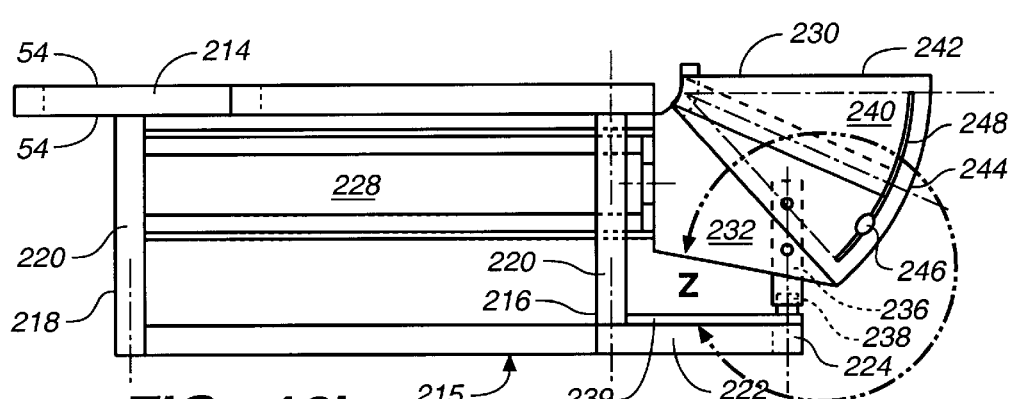
FIG._16b
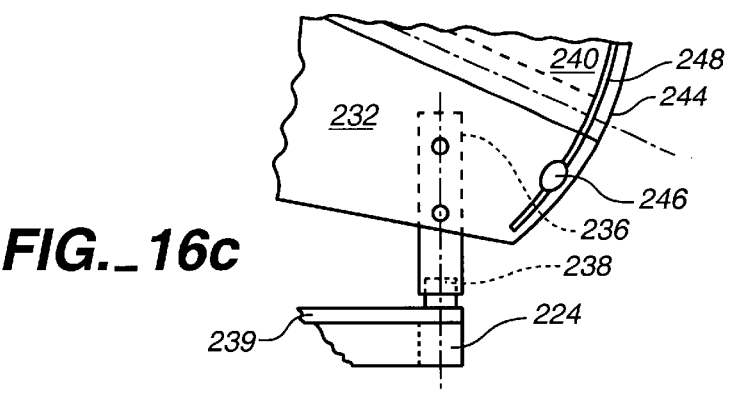
FIG._16c

TABLE

TECHNICAL FIELD OF THE INVENTION

The invention is concerned with a table and a frame, at least three table legs and a table plate.

BACKGROUND OF THE INVENTION

Tables should, especially if designed for the office and workplace area, be flexibly adaptable to all kinds of usage requirements. It should be possible to adapt the working surface of the table to different uses by only a few manual operations, e.g. by combining several tables, and the tables should accommodate accessories and, if needed, working utensils in such a way that they are all conveniently within reach of the user.

Tables with a frame underpinning are usually constructed in such a way, that the table legs are integrated into the frame's corner connector. The table plate is laid on top and is usually permanently connected to the frame. Even if the frame, the table legs and the plate are releasably connected to one another, the position of the table legs in relation to the frame and the table plate is preferably fixed. Accessories such as telephone holders, working lamps, draft holders, monitor holders and the like may be clipped either onto the table plate or onto both the table plate and the frame. When so configured, the table plate can perform a function in the attachment of accessories and is not exclusively available as a working surface.

We are therefore faced with the task of developing a table with a structure that provides utmost flexibility regarding the arrangement of the table legs, the frame and the table plate in relation to one another and to the accessories as far as present. This task is accomplished by a table in accordance with various aspects of the present invention.

SUMMARY OF THE INVENTION

The nucleus of the table according to the present invention is the frame, which is constructed from mutually connected frame sections. The table legs are disposed at various arbitrarily selectable positions in the frame, so that when composing and transposing the table individual requirements and wishes such as providing space for under-table containers, computers etc. can be accommodated. Even after the table has been composed, the table legs can easily be transferred to other positions at any time. The frame can also accommodate connectors for other tables or table elements and/or desk accessories so that the table's plate remains free. "Table elements" below may refer to either a table plate or a frame with a table plate laid on it.

The table of this invention has a number of, and, preferably four or more table legs, which warrant the stability and tilting security of the table. The table legs may be formed at their upper ends in such a way, that they can be attached releasably on the frame.

The table's frame can be constructed from frame sections as a simple rectangle, but it is preferable to manufacture frames in shapes of arc segments or other frame shapes, e.g. triangles or polygons, as far as these shapes can meet ergonomic requirements to a similarly high degree as the arc segment form does.

According to one advantageously enhanced version of this invention's table, the frame sections used for manufacturing the frames show a rectangular, preferably quadratic cross section. They are preferably drawn from aluminium or aluminium alloys, so that they combine the advantages of constructive variability, high precision and low weight, so that a weight and space saving frame construction is made possible.

The frame sections have, preferably on their whole length, slots in their vertical sides. The slots consist of a slot opening, behind which lies a cavity in the interior of the frame section. The fastening tools of the table legs, the connectors and/or the desk accessories interlock in this cavity. From the exterior, however, the slot opening of the section's vertical side can be seen. Since this means that fastening points are generally not predetermined, table legs, connectors and/or desk accessories can be attached to freely choosable locations of the frame at any time.

According to one especially preferable implementation of this table, the frame sections have a slot on each vertical side, so that table legs can be attached according to choice, e.g. in the exterior slot or in the interior slot, depending on what the space conditions may allow for.

The frame sections can be connected to one another in any known way, e.g. by screwing, riveting, welding etcetera. The preferred way, however, is to use corner connectors, which interlock with the frame sections and warrant an especially stiff and low-vibration connection. The corner connectors can be formed as releasable plug connections, but it is preferable to use unreleasable press connections, which are significantly more stable, and in which the corner connectors and frame sections are caused to interlock with a narrow fit under high pressure, for example by cold welding.

It is especially preferable to use a corner connector, which interlocks with each of the connectable frame sections through a pair of tongues. The tongues are preferably of unequal length, so that at a minimal material consumption the highest possible connection stability can be achieved. The two tongue pairs may be connected by a plate that stands vertically to the table plate's level. The angle at which the plate stands between the two tongue pairs is freely choosable. However, an especially technologically feasible and optically appealing solution is the mitre connection, in which the plate halves the angle, at which the tongue pairs stand toward each other.

According to an exemplary implementation, the corner connector which would most reasonably be manufactured as a zinc pressure casting, carries, preferably in direction of the frame's interior side, a receptacle for the table plate. It is especially simple to form the receptacle onto the vertical plate at this location, so that the frame sections themselves remain free. But it is also possible to attach the receptacle in the same way as accessories are attached to the frame, or to shape it like a socket, which can serve to accommodate a plug connected to a table plate into a bore in the frame section. The receptacle preferably consists of a socket with a conic reception opening, a ledge and an extension connected thereto.

The table legs and the desk accessories can be directly equipped with fastening elements that make is possible to fasten these components in the slot of the frame section. However, it is advantageous to use adapters which are specially designed for the slot of the frame sections, so that it becomes possible to safely attach the most diverse parts, including parts that were not specially made for this frame. Such adapters can be attached releasably at freely choosable locations of the frame sections. They may be equipped with reception tools, usable e.g. for table legs or desk accessories. The reception tools can be implemented as a bore, into which a table leg or a telephone stand or a working lamp can be inserted, but it can also be a receptacle for a table plate.

The adapter can be attached to the frame via any releasable connection. The preferred solution however is a clamping connection. Therefore, the adapter has bores preferably for screws. The bores run vertically to the side of the adapter that faces the frame. The screws contain preferably one cotter for fastening them in the frame section's slot. This cotter is preferably placed rotatably on top of the screw. The cotters are preferably rectangular and usually fit through the slot opening with their narrow side, so as to lay themselves obliquely in front of the slot opening within the slot's cavity, when the screw is tightened. This way the adapter is securely fastened to the frame section.

In order to justify the adapter when placing it onto the frame section, the side of the adapter that is directed toward the frame usually has at least one lug that intrudes into the slot opening. The lug's thickness corresponds basically to the wideness of the slot opening, so that this connection contributes additionally to the fastening stability.

When especially heavy or big parts are to be fixed to the frame, the adapter, according to yet another implementation, provides a laying surface, which interlocks from below with the frame section. Thus, in addition to the point-shaped fastenings based on cotters and lugs, the adapter has a support on the frame, which significantly contributes to the tilting security of the adapter and the table leg or accuracy part attached thereto.

The table legs attached to the frame can be made from various materials, but it is preferable to use melts, especially aluminium or aluminium alloys. They can be realized as massive solid sections, but it is preferable to use hollow sections combined from an interior and an exterior pipe. The hollow section economizes on material and weight and is yet highly stable. Moreover, it opens a wide range of configurations and possible later rearrangements for the table legs. The table legs can at their upper end be formed in such a way, that they may interlock with a frame section's slot by e.g. clamping, plugging or screwing. But it is preferable to have the table legs interlock with the above-described adapter at their upper ends, and be fastened onto the frame through this adapter. An especially simple and effective arrangement of the adapter and the table leg is achieved, when the reception opening of the adapter and the upper end of the table leg are conic. When the table leg and the adapter may be inserted into one another, they are justified against a common axis and, in the overlapping region, the the interior surface of the table leg and the exterior surface of the adapter are immediately adjacent to each other. This generates sufficient friction, so that the table leg is, while still releasable, tightly received and justified in the adapter. What is especially advantageous is that so extra tools are necessary for bringing about this connection.

According to one preferable implementation, the table legs are realized as a hollow section with an interior and exterior pipe and contain a slot in the exterior sections, which consists in a slot opening and a cavity located between the exterior and interior pipe. The slot may accommodate fastening elements, on which further desk accessories such as paper baskets or depositing surfaces for printers or computers can be attached. The depositing surfaces are usually fastened to two or more table legs so as to assure the necessary tilting security.

The table plate or another plate that is to be attached to the frame is preferably fastened by a plug-socket connection. The socket may be realized as a tapering reception opening which is continued by a ledge with an extension connected thereto. The plug is preferably cylindric with two sections of unequal diameter. The low-diameter section may be equipped with a screwing thread and may be screwed into a bore provided for this purpose on the lower side of the table plate or another plate. The high-diameter section is preferably equipped with a slot on its free end, in which an elastic ring, preferably an oval snap ring, is inserted. "Elastic ring" below generally refers to a round or oval ring with a flat or round cross section, which is elastically deformed under pressure. The ring needn't be closed completely, it can typically be a snap ring. When the plug and the socket are inserted into each other, the plug's elastic ring engages behind the socket's ledge. Connecting and disconnecting the frame and the plate can be done by exerting pressure on the upper and lower side of the plate, i.e. by striking with the fist.

In order to be able to flexibly work with few tables and to continuously readjust the working surface to the work process, it is desirable that the individual tables or tables and table elements should allow for connecting them to table groups. This invention therefore proposes a connector that is preferably formed as a double U-section and can be connected to the two frames. The frame sections to be connected may be underpinned by a floor plate. From the floor plate several studs extend upward vertically, approximately parallel to the vertical sides of the frame sections. Through bores in the outer studs, screws are inserted, that can be brought to interlock with e.g. the cavity in the slot of the frame sections. Through this screwing, the frames are tightly, yet releasably interconnected. The connector is preferably made by zinc pressure coasting.

One especially advantageous connector has a broadened middle stud with receptacles for desk accessories. Thus the tables or table elements can be interconnected at distance and between the tables or table elements desk accessories can be disposed.

The table of this invention can furthermore be equipped with a cable duct constructed from cable duct elements. This cable duct can likewise be attached in the slot of the frame section. The cable duct elements may be manufactured as U or double U-sections made of synthetic material. The base surface of the element may be formed in such a way, that it overlaps with the base surfaces of adjacent elements. In the overlapping region, a releasable connection, preferably consisting of a snap lug and a snap opening, is formed. The cable duct elements may be formed in such a way, that they can be hanged into the frame section's slot. It is preferable, that the individual elements, when connected together, remain rotatable against each other within certain limits, so that the cable duct can be adjusted to a course that may be required by the frame's shape or the like.

Finally, a carrier for a slidable and tiltable computer monitor can be attached to the table, preferably facing away from the user. The carrier consists, according to one advantageous implementation, of two angles that are disposed on the frame at a certain mutual distance and that are constructed from frame sections with one vertical leg and one leg that generally—in usage position—points away from the table. A slidable carriage is preferably attached to a guide rail disposed between the two vertical legs. According to one especially advantageous implementation, this carriage rolls along a coverplate that is attached between the horizontal legs. Thereby the usually quite heavy monitor is better supported. The carriage preferably consists of a supporting and a carrying element, both of which within given limits can be tilted against each other and arrested. The monitor can then be moved back and forth on the rail between the angles even when the frame is bent. The computer monitor carrier can furthermore include a frame section disposed between the horizontal legs, to which carrier legs may be attached when needed.

In the following we will describe in depth some implementation examples of this invention with reference to the figures, which are briefly explained as follows.

BRIEF DESCRIPTION OF THE DRAWINGS

FIG. 1 a view of the table

FIG. 2 a view of two interconnected tables with a cable duct and a carrier for a computer monitor FIG. 3 a view of three tables with a connecting plate and a printer table FIG. 4a a top view of a rectangular frame FIG. 4b a cross section of a frame section along the cutting line A—A of FIG. 4a FIG. 5a a top view of an arc-segment shaped frame FIG. 5b a cross section of a frame section along the cutting line A—A of FIG. 5a FIG. 6a a top view of a corner connector FIG. 6b a sectional representation along line A—A of FIG. 6a FIG. 6c a sectional representation along line B—B of FIG. 6a FIG. 7a a top view of an adapter FIG. 7b a front view of the adapter of FIG. 7a FIG. 7c a sectional representation along the line A—A of FIG. 7b FIG. 8a a partially sectioned top view of a second adapter FIG. 8b a section along line A—A of FIG. 8a FIG. 9a a view of a table leg that is inserted into the second adapter FIG. 9b a sectional representation through the table leg along line A—A of FIG. 9a FIG. 10a a view of the height adjustment of the table leg FIG. 10b a cross section of the table leg along line A—A of FIG. 10a FIG. 10c a cross section of the table leg along line B—B of FIG. 10a FIG. 10d a view of the sleeve used for height adjustment FIG. 11 a view of a plug that can engage with a receptacle on the table's frame FIG. 12 a sectional representation of a connector that can be used for connecting frame sections FIG. 13 a sectional representation of a connector that can be used for connecting frame sections disposed with a distance between them FIG. 14a a top view of a cable duct element FIG. 14b a front view on a cable duct element FIG. 14c a sectional representation of the cable duct element along the cutting line A—A of FIG. 14a FIG. 15 a view of a table with a computer monitor carrier attached to it FIG. 16a a top view of an arc-segment shaped frame with a computer monitor carrier attached to it FIG. 16b a side view of this frame FIG. 16c detail "Z": how the computer monitor is supported on the computer table In the representations of the diverse implementation examples identical reference symbols are used for identical parts.

DETAILED DESCRIPTION OF THE PREFERRED EXEMPLARY EMBODIMENTS

FIG. 1 shows a table 2 with a frame 4, with five table legs 6, which are attached to frame 4 at freely choosable locations, and with a table plate 8, which lies on the frame 4. Moreover on frame 4 desk accessories are attached. A telephone holder 10 and a work lamp 12 are attached to frame 4 at freely choosable locations.

In FIG. 2 the frame 4 is depicted without the table plate, so that the individual frame section 16, which may be connected via the corner connectors 18 to form a frame, become visible. On the frame 4 at the corner connectors 18, table plate receptacles 20 may be disposed one each.

FIG. 2 shows connectors 22, via which a table with a carrier 215 for a computer monitor 219 is suitably attached to the arc-segment shaped frame 4 of the first table 4. In FIG. 3 a possible combination of three tables or table elements 2a, 2b and 2c is represented, which can be connected by a connection plate 24. The connection plate 24 clicks together with the adapters 26, which may be fastened to the frames 4a, 4b and 4c of the tables 2a, 2b and 2c. For this purpose the adapters 26 have receptacles 28, which align with the plugs 30 of the connection plate 24. On the legs 6 of table 2 a mountable frame 32 with a plate 34 may be attached, on which e.g. a printer or a PC station can be placed.

A rectangular frame 4a is shown in FIG. 4. The frame is usually built from 4 frame sections 16, which may be interconnected through corner connectors 18 indicated in the drawing. The frame sections 16 may be made out of an aluminium alloy. FIG. 4b shows a cross section cut diagonally to the longitudinal axis of the frame section 16. The frame section 16 usually has a quadratic cross section. Its vertical (with respect to the table plate 8) sides 36 have one slot 38 each carved into them, which may extend over the whole length of the frame section 16. The slot 38 usually has a slot opening 40 in the vertical side 36 of the frame section 16. This opening leads into a cavity 42 located near the inside of the frame section 16. The cavity 42 is delimited by the pressing surface 44 located opposite to the slot opening 40, by the interior surface of the vertical side 36 functioning as a bearing surface 46, and the section studs 48 which extend mainly vertically to the pressing and bearing surfaces 44 and 46 respectively. The pressing surface 44 and the bearing surface 46 serve to support fastening elements such as screws, clamps and cotters. In the slot 38 of the frame sections 16, the components to be attached to the frame 4 such as table legs 6, desk accessories 10, 12 and/or connectors 22 are received. The components may be fastened onto the frame 4 either directly or through an adapter 14. To achieve this, a cotter 100 or a snap hook 210 interlocks with slot 38.

The pressing surfaces 44 and the section studs 48 surround a central cavity 50, which usually open at the front surfaces of the frame section 16. For the justification of fastening elements, a number of approximately symmetrically disposed centering lugs 52 protrude into the cavity 50. In this cavity 50, fastening elements such as screws may be accommodated, by which either the frame sections 16 may be connected to one another or plugs of terminator caps designed to terminate the open front ends of frame sections are attached.

The horizontal sides 54 of the frame sections 16 usually have excavations 56. The excavation 56 that is adjacent to the table plate 8, can be stuffed with felt strips or other cushioning elements that improve the way the table plate 8 lies on the frame 4.

The horizontal sides 54 and the section studs 48 generally surround cavities 58 each, which accommodate the corner connectors 18 designed to connect the frame sections 16. The corner connectors 18 can suitably interlock with the cavities 42 of the slots 38, but in this case the free arrangement of the table legs and/or the desk accessories may be limited.

FIG. 5a shows an arc-segment shaped frame 4 in top view. The frame sections 16 show the same cross section as those of the rectangular frame 4 (FIG. 5b). The curved frame sections 16 likewise have a slot 38 on each vertical side 36, which is built just like the slot described in FIG. 4b.

FIG. 6a shows a corner connector 18 made by zinc pressure casting, which represents the preferred solution for connecting the frame sections 16 to a frame 4. The corner connector generally has two pairs of tongues 60 and 62, which are disposed at about the same angle toward each other as the connecting frame sections. The position of the tongues of the pairs 60, 62 which is adjusted to the angular positioning of the frame sections 16, can also be seen in the corner connectors 18 indicated in FIG. 5a. As can be seen in FIG. 6b, the tongues 62 have an exterior contour which generally corresponds to the interior contour of the frame sections' 16 cavity 58, with which the corner connectors 18 interlock in the finished frame 4. The tongue pairs 60, 62 are sized in such a way, that they interlock into the corresponding cavities 58 with a narrow fit when the frame sections 16 are pushed onto the corner connector 18.

The tongues are connected by a plate 64 that is positioned vertically to the plane of the table plate 8. The plate 64 halves the angle, with which the two frame sections 16 stand against each other, so that a mitre connection is formed. During production of the frame, the frame sections 16 are suitably cut to a mitred shape at the front surfaces that border on the plate 64, so that after connecting the frame sections 16 and the corner connectors 18, they terminate in alignment with the plate 64. The frame sections 16 and the corner connectors 18 are then suitably cold-welded together at a high surface pressure of about 7 t/cm$^2$. This creates an unreleasable connection between the frame sections 16 and the corner connector 18.

A shown in FIG. 6c, the corner connector 18 has a receptacle 20 for releasably connecting the table plate 8, which protrudes from the plate 64 into the frame 4. The receptacle 60 consists of a socket 65 with a tapering reception opening 66 which passes into a ledge 68, beneath which it is joined to an extension 70. In order to attach the table plate 8, the reception opening 66 accommodates a plug 146 fastened on the lower side of the table plate 8, on whose free end an elastic ring 160 is attached, which engages in the extension 70 behind the ledge 68.

FIGS. 7a to 7c show an adapter 14 for desk accessories which may be fastened in the slot 38 of the frame 4 at freely choosable places. The adapter 14 has a reception opening 72. This reception opening 72 may be realized as a pot-shaped bore vertical to the plane of table plate 8. The desk accessories, in this case the telephone holder 10 or the working lamp 12, can be inserted with a cylindric rod-shaped ledge (not depicted) into the reception opening 72. As can be recognized from FIG. 7c, the reception opening 72 has a number of sections with unequal diameters. A first section 74 has the largest diameter; it is succeeded by a second section preferably having a reduced diameter. These two sections 74 and 76 accommodate the rod formed ledge of the desk accessories. Below the section 76 what follows is the section 78 with the smallest diameter. Toward the lower side of the adapter 14 section 80, which links up with section 78, opens itself. Through the sections 78 and 80 a screw can be inserted, which according to this preferred implementation can be screwed into a bore that has an interior thread, which is generally situated at the lower end of the desk accessory's rod-shaped ledger.

Two bores 82 and 84 extend to the right and left beside the reception opening 72 and vertically thereto. The bores 82 and 84 penetrate the adapter 14 from the side that points away from the table 86 to the table-facing side 88. On side 88 the bores 82 and 84 are in one section extended in a pot-shaped bore manner. Through the bores 82 and 84 the screws 92 and 94 are conducted, which can be moved around within the bores 82, 84. A first end 96 of the screws may have a head with a hexagonal sockethead bolt. The second end 98 of the screws may be equipped with a thread, on to which one cotter 100 each may be screwed. By riveting the ends 98 of the screws 92 and 94, the cotter 100 is unloseably fastened on the screw. The section 90 of the bores 82 and 84 may be fixed in such a way, that the cotters 100 are completely accommodated therein, so that they terminate in approximate alignment with the surface 88. Moreover the adapter 14 may have on its surface 88 two protruding lugs 102, 104. These lugs 102 and 104 may be disposed at the largest possible mutual distance on the adapter 14 and they are located at approximately the height of the slot 38. The thickness of the lugs 102, 104 generally to the width of the slot opening 40.

The adapter 14 may be fastened on the frame 4 as described in the following. The screw 92, 94 are retracted far enough so that the cotters 100 are completely accommodated in section 90. Next, the adapter 14 is positioned in front of the frame 4 with its table-facing side in such a fashion, that the lugs 102, 104 interlock with the slot opening 40. Now the adapter is approximately horizontally justified and the cotters 100 can be introduced in an approximately horizontal position through the slot opening 40 into the cavity 42. The screws 92, 94 are for this purpose pushed ahead in direction of the frame 4. During this operation the cotters lock themselves in the cavity 42, as the flanks of the cotters press on the section studs 48. The adapter-facing exterior surfaces 106 press, when the screws are tightened, against the contact surfaces 46 of the slot 38. When so configured, the adapter 14 is fastened by traction on the frame 4. As soon as the screws 92, 94 are tightened, the telephone holder 10 or the working lamp 12 may be inserted into the reception opening 72 and screwed in from below through the sections 78 and 80.

Instead of the reception opening 72, an adapter 26, which may be formed in the same way as adapter 14, can, as shown in FIG. 3, have a receptacle 28, which can be caused to interlock with a plug 146 that is suitably inserted into the lower side of a table plate 8 or another furniture element.

Another implementation example of an adapter is shown in FIGS. 8a and 8b. The adapter may be used to fasten a table leg 6 at an arbitrary location on the frame 4. The adapter 108 has a receptacle 110 that suitably extends from its lower side upward. The receptacle 110 tapers upwards to a regular conic form. The table leg 6 may then be plugged into the receptacle 110 from below and adheres to it by friction.

As in the adapter 14 described in FIGS. 7a to 7c, also in adapter 108 two bores 112 and 114 are disposed approximately vertically to the receptacle 110, which extend into the sections 116 and 118 respectively, which are formed on the side of the adapter 108 that faces the frame 4. The screws 111 and 113, which may be equipped with cotters 109 for attaching the adapter 108 to the frame 4, are plugged through the sections 116, 118. The adapter 108 has on that of its sides which faces frame 4 the lugs 122 and 124, which are disposed at the height of the slot opening 40 of the frame section 16. Their thickness roughly corresponds to the height of the slot opening 40. Moreover, the adapter 108 may have on that of its sides which faces frame 4 a protrusion 126, which, when the adapter 108 is in position, underpins the frame 4. This means that the adapter 108 is, when the screws are tightened, fastened stiffly and securely to the frame 4, excluding any possibility of displacement or tilting. The table leg however can simply and quickly be transposed, as soon as the two screws are released and the adapter is—with or without the table leg—either shifted within the slot 38 or inserted into the slot 38 of another frame section 16.

The adapters 14, 108 shown in FIGS. 7a–7c and 8a, 8b may be made by zinc pressure casting.

FIG. 9a shows a table leg 6 which may be inserted into the adapter 108 with its upper terminal section. The upper terminal section 128 may be bevelled to the same conic shape as the receptacle 110 of the adapter 108. The table leg 6 and the adapter 108 preferably touch each other with their whole surface. The table leg 6 consists as shown in FIG. 9, of an outer pipe 130 and an inner pipe 132, which may be connected by studs 134 and 136. Between the contact points of the stud 136 a slot 138 may be grooved into the exterior pipe, which includes a slot opening 140, a cavity 142 located behind the slot opening 140, which is limited by the interior pipe and the stud 136, and contact surfaces 144, which limit the slot opening 140 on the side of the cavity 142. The slot extends over approximately the whole length of the table leg 6. In the slot 138 at freely choosable locations on the table leg 6 desk accessories or trays 32, 34 for office machinery such as computers or printers can be attached, as shown in FIG. 3.

The table leg 6 may have, as shown in FIG. 10a, at its lower end a height adjusting and height compensating device. The height adjusting device may be a ball indentation adjustor, by which the height of the table 2 can be adjusted. The height compensating device may be implemented as a stepless screwing thread, by which unevennesses of the floor can be compensated at each table leg individually. The above described table leg 6 may be manufactured as a drawn aluminium section.

FIGS. 10a–10d show details of the height adjustment device. Into the interior pipe 132 of the table leg a sleeve 131, as shown in detail in FIG. 10d, may be slidably inserted. The sleeve 131 protrudes from the lower end of the table leg 6 (see FIG. 10a). On the surface of the sleeve 131 there may be marks that display, to which height the table leg is set. The marks are suitably visible to the person who sets the table leg 6 to the desired height. The sleeve 131 may be equipped with several bores 133, by which the sleeve 131 and the table leg 6 are fixed toward each other in a predetermined position. The table leg 6 is, for the purpose of fastening the sleeve 131, equipped with a number of, and preferably bores 135 and 137, which penetrate the interior pipe 132 and the exterior pipe 130. The bores 135 and 137 are disposed on that side of the table leg 6 which is opposite to the slot 138. Through the lower bore 135 a socket 139 may be inserted, as shown in FIG. 10b, which accommodates a ball 141, which is suitably positioned in the socket 139 against a spring 143. The sleeve 131 is inserted into the interior pipe 132 in such a way, that the bores 133, which are aligned to one row, lie opposite to the socket 139. When the sleeve 133 is moved within the interior pipe 132 and a bore 133 lies opposite to the ball 141 at the same height level, the ball 141 engages in the bore 133. However, this way the sleeve 131 is fastened in the interior pipe 132 only initially, because due to the low spring force of the spring 143 even low traction or pressure forces suffice to press the ball 141 against the spring 143 and thereby move the sleeve 131. This effect is desirable for fastening the sleeve 131 by hand, but in order to establish a stressable connection, another fastening tool is needed, which is shown in FIG. 10c.

Through bore 137, which in usage position is located above bore 135, a screw 147 held by a cotter 145 is built in. When the sleeve 131 is fastened in the interior pipe 132 by means of the ball 141, bore 137—and with it screw 147—is also located opposite to a bore 133. For the purpose of fastening the sleeve 131 and the table leg 6 onto each other, the screw 147 may be screwed through bore 137 into the corresponding bore 133. This way the table leg 6 may be set to the desired height.

The height compensation may be done with help of the lower end 149 of the sleeve 131 and of a table leg 151. The table leg 151 generally consists of a floor plate 153 and a bolt 155 with an external thread which is centeringly inserted in the floor plate 153. The bolt 155 interlocks with the lower end 149 of sleeve 131, which has an interior thread. The table leg 151 is rotatable against the sleeve within a range that is generally smaller than the distance of the bores 133 from each other. The height compensation occurs when the sleeve 157 is pushed upward and the table leg is rotated.

FIG. 11 shows a plug 146, which can be inserted in a table plate to be connected with table 2, and which works in combination with the receptacle 20 described in FIG. 6. The plug 146 is usually cylindric and has a first section 148 equipped with a thread 150. This first section 148 can be screwed into a corresponding bore on the lower side of a table plate 8 (not depicted). A second section 152 generally has a larger diameter than the first section 148. The free front side 154 of the second section 152 has a hexagonal sockethead bolt screwhead built into it. The second section 152 has a ring shaped slot 158 built into it. The slot 158 has an elastic oval-shaped snap ring 160 inserted into it. The snap ring 160 may be made of spring steel. The slot 158 with the snap ring 160 may be located in the second section 152 in such a way, that the snap ring 160 presses onto the ledge 68 of the receptacle 20. The plugs 146 may be disposed on the lower side of the table plate 8 in such a way, that they are in alignment with the receptacles 20 when the table plate is loosely placed on the frame 4. The table plate 8 then simply engages with the receptacles when hand pressure is applied.

FIG. 12 shows how the frame sections 16 of two frames 4 are interconnected through a connector 22. The frame sections 16 generally have a slot 36 on each vertical side 36. The connector 22 usually consists of a floor plate 162, a number of exterior studs 164 and 166 pressing onto the vertical sides 36 of the frame sections, and a middle stud 168, which intrudes between the frame sections to be connected. The studs 162, 164 and 166 extend vertically from the floor plate 162 upwards. The middle stud 168 has a number of projections 170 which protrude into the slot openings 40 and thus position the frame sections 16 against each other in defined positions.

The exterior studs 164, 166 have one bore each, usually through which a fastening screw 172 protrudes. The bore and the fastening screws 172 may be distanced from the floor plate 162 in such a way, that the screw protrudes through the slot opening 40 into the cavity 42 and presses against the press contact surface 44 when the connector may be fastened. The connector is made from zinc pressure casting.

FIG. 13 shows a second connector 174, which is suitably provided for connecting a number of tables or a table and a table element at a given mutual distance. This connector 174 has floor sections 176, from which studs 178, 180, 182 extend vertically upward. The middle stud 180 may have on those of its surfaces which border on the vertical sides 36 of the frame sections 16, projections 184, which protrude into the slots 38 of the frame sections 16. The middle stud 180 of this connector 174 is generally sized wide enough to accommodate reception tools for desk accessories. Here the reception tool consists of a suitably pot-shaped bore 186 which passes into a narrower bore 188, which extends up to the lower side of the middle stud 180. A cylindric section of the desk accessory (not depicted), whose diameter corresponds with the pot-shaped bore 186, can be inserted into the bores 186, 188 and may be if this accessory section contains a bore with an interior thread, fastened by means of a screw (not depicted) which may be inserted through the bore 188 from below.

FIGS. 14a–14c show an element of a cable duct. Several elements may be releasably connected to form a cable duct in which power supply and control cables for a number of devices located on table 2 may be invisibly deployed under the table plate. The element 190 may be realized as a double U-section. It shows a floor surface 192 and studs 194, 196 extending from there upwards. Next to stud 196, a connection surface 198 may join the floor surface 192 of the cable duct element 190. From the connection surface 198 a further stud 200 extends upwards. The floor surface 192 may be at least in some sections, wider than the studs 194, 196, 20, as can be seen from FIG. 14c.

In one end of the cable duct element, the floor surface 192 may be displaced downwards in a first section 202, as can be recognized clearly from FIG. 14c. In section 202, approximately centered between the studs 194 and 196, a snap lug 204 may be formed, which protrudes out of section 202 upwards over the floor surface 192. On the opposite side of the floor surface 192, a snap opening 206 may be built in alignment with the snap lug 204. The snap lug 204 and the snap opening 206 may be disposed in such a way, that when connecting the several cable duct elements the snap lug 204 of one element can be caused to interlock with the snap opening 206 of another element. The elements 190 may be connected by simply pressing them together. Since the individual elements are interconnected only punctually, they remain rotatable against each other and therefore adjust themselves not only to straight but also to curved contours. Angles between the individual elements of 15° or more are possible without difficulty.

The part of the cable duct element 190 that is limited by the studs 194 and 196 may be designed for receiving power supply cables. The stud 196 may have a number of projections 208 disposed on top of each other and formed onto the stud, which may be opened toward the stud 194. Between the projections, cables can be clamped in. The part of the cable duct element which is delimited by the studs 196 and 200 is provided for receiving control cables and generally cables of a smaller diameter. The cable duct element 190 may be made of synthetic material.

The stud 200 may be formed in such a way, that it can be caused to interlock with a slot 38 of a frame section 16. On the end facing away from the connecting surface 198, a map hook 210 may be formed onto the stud 200. When the cable duct element 190 may be attached to the frame 4, the snap hook 210 is introduced through the slot opening 40 into the cavity 42, and an engaging surface 212 pointing away from the cable channel element, which may be formed onto the stud 200, interlocks with the frame section from below and fastens the cable channel element 190.

FIG. 19 shows a partial view of a carrier 215 for a computer monitor 210. On that of the sides of the circle are segment shaped table 2 which faces away from the user a carrier 215 for a computer monitor may be mounted. The carrier 215 generally consists of two angles 216, 218, one of which is shown in FIG. 15. The angles 216, 218 carry a coverplate 239, along which a carriage 230 rolls. The carriage 230 is retained on a rail 228 mounted between the legs 220 of the angles 216, 218. It rolls within the rail 228 by means of castors 234. The carriage may have reception tools 241 for the computer monitor 219.

FIGS. 16a–16c show a top view and a side view of the frame 4 and the carrier 215 for the computer monitor 219, which is depicted in FIGS. 1, 2 and 15. The frame 4 may be arc-segment shaped. On the exterior frame section 214 a carrier 215 with the angles 216 and 218 for a computer monitor 217 may be mounted. A first leg 220 of the angles 216, 218 may extend from the frame section 214 vertically downwards, the second leg 222 of the angles 216, 218 may extend within the plane of the frame 4 but displaced in parallel downwards away by means of an arc-segment shaped frame section 224. The frame section 224 may be connected with the horizontal legs 222 through corner connectors. The legs 220, 222 of the angles 216 and 218 may be fastened together, and likewise the angles 216, 218 may be fastened together with the frame section 214. For this purpose bores may be conducted through the horizontal exterior walls 54 of the frame section, which may be penetrated by screws of other fasteners which interlock with the central cavity 50 of the angular sections (see description of FIG. 4b). On the angles 216, 218 and/or the frame profile 224 receptacles 226 for the coverplate 239 (see also FIGS. 1, 2 and 15) may be mounted.

On the legs 220 of the angles 216, 218 a rail 228 is mounted, which is profiled in such a way, that it can accommodate and guide the castors 234 of the carriage 230 (see also FIG. 15). The carriage 230 may have a propping element 232, on which the castors 234 which interlock with the rail 228 may be mounted. On the propping element 232, a propping roll 238 may be mounted on a carrier 236, as can be seen from FIG. 16c, which rolls along the coverplate 239, which may be mounted between the legs 222 of the angles 216, 218. On the upper edge of the support element 232 facing the frame 4, a carrying element 240 is hinged, which may be arranged to swivel around an axis that runs parallel to the frame section 218. On the surface 242 of the carrying element 240, receptacles 241 for a computer monitor 219 may be disposed (see FIGS. 1,2 and 15). The carrying element 240 and the propping element 232, moreover, may interlock on the side 244 that faces away from the frame, by means of letting a clamping screw 246, which is also easily recognized in FIG. 1, engage through nicks 248, which may be formed in the carrying element 240 and in the propping element 232. The carrying element 240 can thus be steplessly swivelled in relation to the propping element 232 in an angle range of at least 15° and can be arrested on the propping element 232 in any chosen position by means of the clamping screw 246.

We claim:
1. A table comprising:
   a frame
      which is constructed from a plurality of interconnected frame sections, wherein said interconnected frame sections form at least one receptacle for a table plate, wherein said frame sections have a slot which extends substantially parallel to a plane of said table plate throughout substantially the whole length of said frame section; and at least three table legs, wherein said table legs have an upper end which is predisposed for mounting at freely chooseable locations about said frame sections.

2. A table according to claim 1, with the feature that said frame sections interlock by means of a corner connector which is solidly or unreleasably connected for forming said frame.

3. A table according to claim 1, with the feature that a corner connector for connecting said frame sections has two pairs of tongues, wherein said pairs of tongues are fitted into two cavities of said frame sections which are connected, wherein said cavities extend substantially parallel to said table plate, and wherein said two tongue pairs of said corner connector are connected by a vertical plate, wherein said vertical plate is substantially perpendicular to a plane of said table plate.

4. A table according to claim 1, with the feature that on said frame sections or a corner connector for connecting said frame sections, preferably on a vertical plate of said corner connector, said receptacle for said table plate is mounted.

5. A table according to claim 1, with the feature that said table leg is formed from a hollow section, wherein said hollow section is formed from an interior pipe surrounded by an exterior pipe, and wherein said exterior pipe has a slot.

6. A table according to claim 1, with the feature that a plurality of individual cable duct elements are hung into said slot of said frame sections such that a first cable duct is formed, wherein said cable duct elements are built from a U-section or a double U-section, wherein said U-sections have a floor surface formed in such a way that a second cable duct element is joined on to said first cable duct element via a releasable snap connection, and wherein a substantially vertical section is formed at an upper end of said snap connection in such a way that said snap connection can interlock with said slot of said frame section.

7. A table comprising:
a frame
  which is constructed from a plurality of interconnected frame sections, wherein said interconnected frame sections form at least one receptacle for a table plate, wherein said frame sections have a slot which extends substantially parallel to a plane of said table plate throughout substantially the whole length of said frame section;
at least three table legs, wherein said table legs have an upper end which is predisposed for mounting at freely chooseable locations about said frame sections; and
an adapter with at least one reception opening for at least one of said table legs, said table plate, and a desk accessory,
  wherein two bores to the right and left of said reception opening extend basically vertically to said reception opening,
  wherein two screws are guided through said two bores,
  wherein on an end facing away from a head of each of said screws, a cotter is fastened,
  wherein said cotter is sized in such a way that said cotter is latched in a slot of said frame sections, and
  wherein said adapter may be fastened releasably at freely chooseable locations of said frame sections.

8. A table according to claim 7, with the feature that said adapter has on a surface facing said frame, at least one lug, wherein the thickness of said lug basically corresponds to the height of said slot opening, and wherein after said adapter is fastened on said frame section, said lug protrudes into said slot.

9. A table according to claim 7, with the feature that said adapter has a placement surface which interlocks with said frame section from below.

10. A table according to claim 7, with the feature that said table plate has on a lower side of said table plate, at least one plug, wherein a first end of said plug has a thread for screwing said plug into said table plate, wherein a second end of said plug has a slot into which an elastic ring is mounted, and wherein said plug is screwed into said table plate in such a way, that when said table plate is laid onto said plug, said plug is in alignment with said reception opening of said frame, and engages with said reception opening when said elastic ring touches a ledge of said reception opening.

11. A table comprising:
a frame
  which is constructed from a plurality of interconnected frame sections, wherein said interconnected frame sections form at least one receptacle for a table plate;
an adapter configured to mount at freely chooseable locations about said frame sections; and
at least three table legs, wherein an end of each of said table legs which faces said adapter tapers conically in the direction of a front surface of said table legs, wherein a reception opening of said adapter is likewise conically formed, and wherein said table leg is inserted into said adapter such that a surface of said end of said table legs conforms to a surface of said adapter when said table leg and said adapter are connected.

12. A table comprising:
a frame
  which is constructed from a plurality of interconnected frame sections, wherein said interconnected frame sections form at least one receptacle for a table plate, wherein said frame sections have a slot which extends substantially parallel to a plane of said table plate throughout substantially the whole length of said frame section;
at least three table legs, wherein said table legs have an upper end which is predisposed for mounting at freely chooseable locations about said frame sections; and
an adapter for mounting on said frame sections has two bores, through which two screws are guided, which on one end have a cotter, such that said cotter interlocks with said slot opening of said frame, wherein said adapter has an arm facing away from said frame, and wherein said arm has a receptacle which can engage a plug with an elastic ring mounted on a furniture element.

13. A table comprising:
a frame
  which is constructed from a plurality of interconnected frame sections, wherein said interconnected frame sections form at least one receptacle for a table plate;
at least three table legs, wherein said table legs have an upper end which is predisposed for mounting at freely chooseable locations about said frame sections; and
a connector, wherein said connector are attached to said frame such that a first table may be releasably connected with at least one of a second table and a table element,
  wherein said connector is formed as a double U-section with at least three vertically standing studs,
  wherein said vertically standing studs are positioned opposite to a vertical side of said frame section,
  wherein said connector has a floor plate which interlocks from below said frame sections which are connected,
  wherein a plurality of screws corresponding to the number of said external studs are inserted into said exterior studs, and wherein after said connector is fastened to said frame, said connector presses onto a pressure contact surface in an interior of said frame sections.

14. A table according to claim 13, with the feature that said connector has floor sections from which said at least three studs extend vertically upwards, wherein a middle stud is formed large enough such that two frames may be positioned at a defined mutual distance, and wherein said middle stud has a reception opening in which a desk accessory is accommodated.

15. A table comprising:

a frame
which is constructed from a plurality of interconnected frame sections, wherein said interconnected frame sections form at least one receptacle for a table plate;

at least three table legs, wherein said table legs have an upper end which is predisposed for mounting at freely chooseable locations about said frame sections; and a carrier for a computer monitor,
wherein said carrier is adjustably mounted on said frame by means of letting a pair of angles formed from said frame sections be attached to said frame at a mutual distance,
wherein a first leg of said pair of angles extends vertically upwards and a second leg of said pair of angles extends substantially parallel to said plane of said table plate, and displaced in parallel downwards, away from said table plate to the outside of said frame,
wherein between said second horizontal legs, a supporting plate is attached,
wherein a mobile carriage rolls along said support plate, and
wherein said mobile carriage is mounted on a guide rail attached between said first pair of legs.

16. A table frame comprising:

a plurality of interconnected frame sections, with each of said frame sections having at least one slot opening formed therein, wherein said at least one slot opening extends throughout the length of said frame sections, and wherein said slot opening is located on a surface of said frame sections substantially perpendicular to a plane defined by said table frame;

a means for attaching table legs and accessories at freely chooseable locations about said frame sections; and a plurality of corner connectors, wherein said corner connectors have at least one receptacle for a table plate, wherein said corner connectors are fitted into said frame sections to form said table frame, and wherein each of said corner connectors has two pairs of tongues configured to conform to corresponding cavities formed in said frame sections, wherein said cavities extend into said frame sections substantially parallel to said plane, and wherein said pairs of tongues are connected by a plate which is substantially perpendicular to said plane.

17. A table arrangement comprising:

a plurality of frame sections, each containing at least one slot opening, wherein said at least one slot opening extends throughout the length of said frame section, and wherein said slot opening is located on a surface of said frame section substantially perpendicular to a plane defined by said table frame sections;

an adapter configured to attach an accessory to said frame sections, said adapter comprising:
a reception opening formed therein;
two bores formed therein such that said reception opening is located between said two bores, said two bores extending substantially parallel to said reception opening;
two fasteners guided through said bores, each of said fasteners having a head located at a first end and a cotter located at a second end opposite said first end, said cotter being sized to seat within said slot opening; and a plurality of corner connectors, each having a means for connecting said frame sections together.

* * * * *